US011893563B2

(12) United States Patent
Kumagawa et al.

(10) Patent No.: US 11,893,563 B2
(45) Date of Patent: Feb. 6, 2024

(54) READING SYSTEM, SHOPPING ASSISTANCE SYSTEM, READING METHOD, AND PROGRAM

(71) Applicant: Panasonic Intellectual Property Management Co., Ltd., Osaka (JP)

(72) Inventors: Masahiro Kumagawa, Hyogo (JP); Kazuhiko Yahata, Kanagawa (JP); Suguru Kojima, Kanagawa (JP); Masahiro Nakano, Tokyo (JP); Shinsuke Ogata, Tokyo (JP); Koji Imamura, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 418 days.

(21) Appl. No.: 17/263,276

(22) PCT Filed: Jul. 29, 2019

(86) PCT No.: PCT/JP2019/029612
§ 371 (c)(1),
(2) Date: Jan. 26, 2021

(87) PCT Pub. No.: WO2020/027034
PCT Pub. Date: Feb. 6, 2020

(65) Prior Publication Data
US 2021/0150505 A1 May 20, 2021

(30) Foreign Application Priority Data

Jul. 31, 2018 (JP) .................. 2018-144591

(51) Int. Cl.
*G06Q 20/20* (2012.01)
*G06K 7/10* (2006.01)
*G06K 19/077* (2006.01)

(52) U.S. Cl.
CPC ....... *G06Q 20/208* (2013.01); *G06K 7/10039* (2013.01); *G06K 7/10099* (2013.01); *G06K 7/10108* (2013.01); *G06K 19/07758* (2013.01)

(58) Field of Classification Search
CPC ............ G06Q 20/208; G06K 7/10039; G06K 7/10099; G06K 7/10108; G06K 19/07758
(Continued)

(56) References Cited

U.S. PATENT DOCUMENTS

2009/0145965 A1 6/2009 Davis et al.
2012/0019399 A1* 1/2012 Vargo ................. G06K 7/10079
340/870.11
2019/0244161 A1* 8/2019 Abhishek ............. G06Q 10/087

FOREIGN PATENT DOCUMENTS

JP 2008-299404 A 12/2008
JP 2011-001132 A 1/2011
(Continued)

OTHER PUBLICATIONS

International Search Report issued in Patent Application No. PCT/JP2019/029612 dated Oct. 21, 2019.

*Primary Examiner* — Ariel J Yu
*Assistant Examiner* — Denisse Y Ortiz Roman
(74) *Attorney, Agent, or Firm* — PEARNE & GORDON LLP

(57) ABSTRACT

A reading system includes an evaluation value acquirer and a determining processor. The evaluation value acquirer is configured to acquire, with regard to a reading device configured to perform wireless communication with an electronic tag attached to each of one or more items by using a radio wave as a medium to read item information on each of one or more items, an evaluation value about at least one of: the number of times; a time interval; or a frequency, of reading the item information for each of at the one or more items. The determining processor is configured to determine, (Continued)

for each of the one or more items, whether or not each of the one or more items is an object to be read based on a change in the evaluation value over time.

19 Claims, 16 Drawing Sheets

(58) Field of Classification Search
USPC .................................................... 705/23, 28
See application file for complete search history.

(56) References Cited

FOREIGN PATENT DOCUMENTS

| JP | 2016-162177 A | 9/2016 |
| JP | 2018-041365 A | 3/2018 |

* cited by examiner

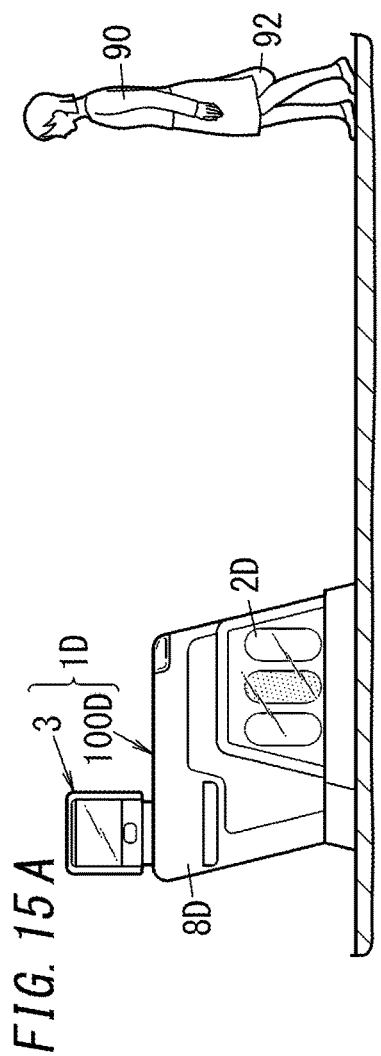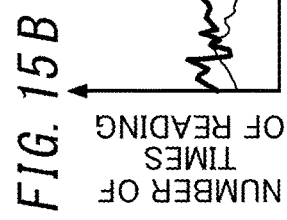
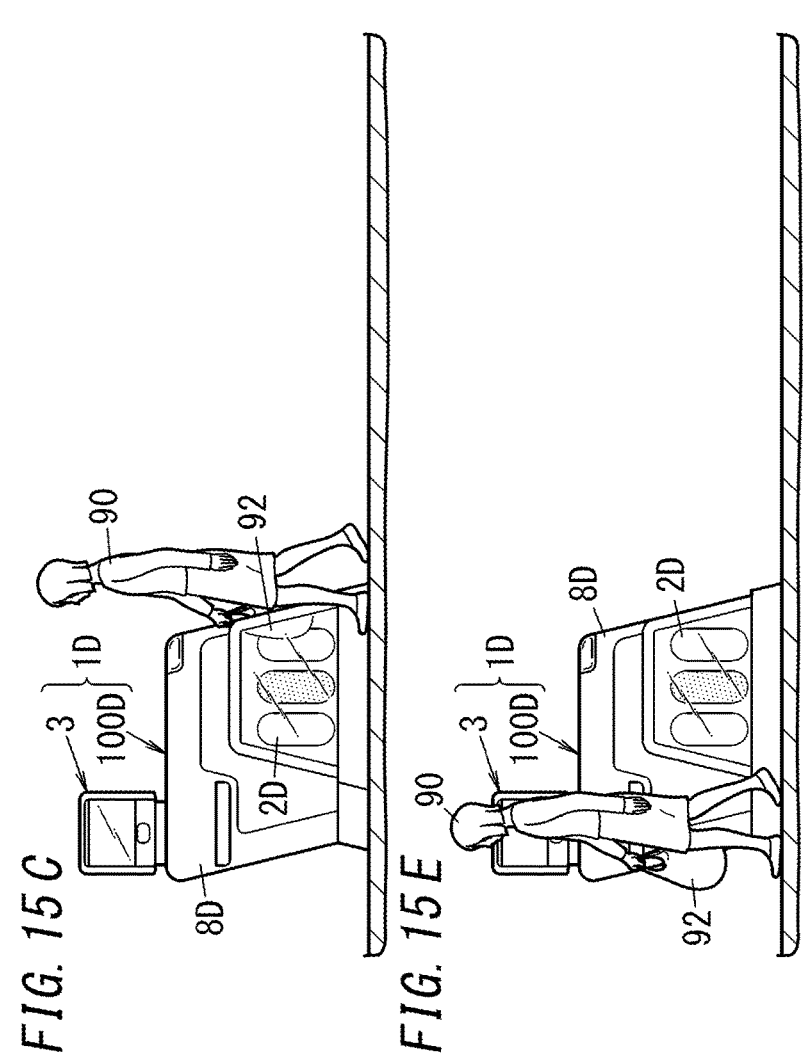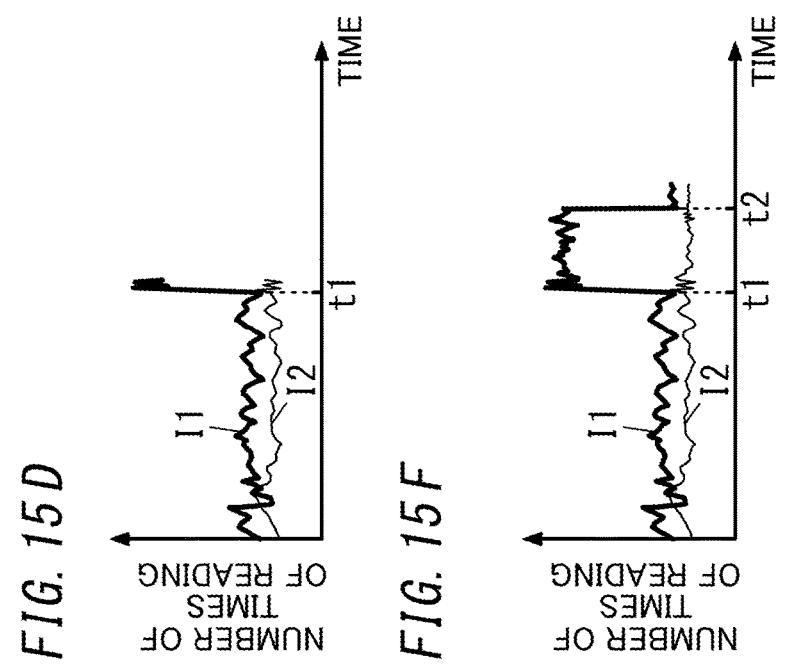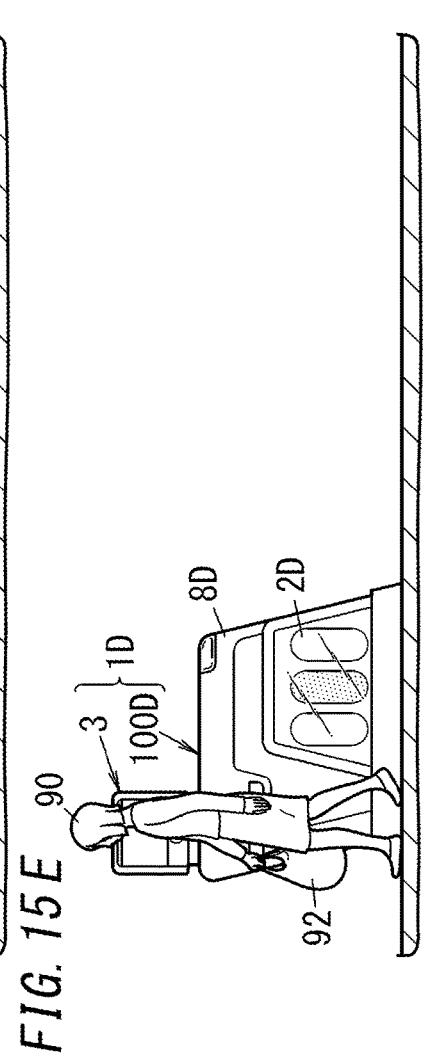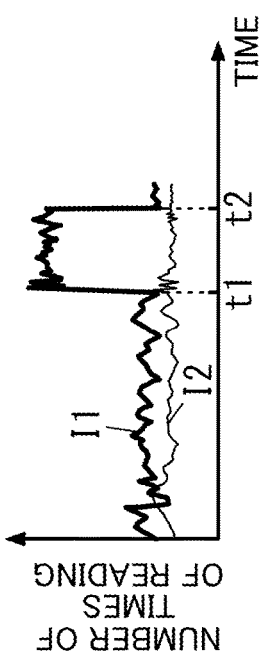

READING SYSTEM, SHOPPING ASSISTANCE SYSTEM, READING METHOD, AND PROGRAM

This application is a U.S. national stage application of the PCT International Application No. PCT/JP2019/029612 filed on Jul. 29, 2019, which claims the benefit of foreign priority of Japanese Patent Application No. 2018-144591 filed on Jul. 31, 2018, the contents all of which are incorporated herein by reference.

TECHNICAL FIELD

The present disclosure relates to reading systems, shopping assistance systems, reading methods, and programs, and specifically, to a reading system, a shopping assistance system, a reading method, and a program which are used for reading item information from an electronic tag.

BACKGROUND ART

Patent Literature 1 describes a Point Of Sales (POS) apparatus configured to perform at least a checkout (payment) process of a product to be purchased by a customer, and the POS apparatus includes a reading device for reading a Radio Frequency (RF) tag (electronic tag). The electronic tag is attached to the product and stores price information or identification information on the product to which the electronic tag is attached.

In Patent Literature 1, the reading device reads information from the electronic tag in a state where the product is stored in an accommodation chamber having a shape of a box including six surfaces of a housing. The housing has an opening communicated with an inner space of the accommodation chamber. The opening is opened and closed with a lid member. That is, in a state where the lid member is held open, a customer can put the product in the accommodation chamber through the opening. The housing and the lid member are made of a material which reflects radio waves or a material which absorbs radio waves so that the reading device does not read one or more information pieces respectively on one or more electronic tags located outside the accommodation chamber.

CITATION LIST

Patent Literature

Patent Literature 1: JP 2016-162177 A

SUMMARY OF INVENTION

With the configuration described in Patent Literature 1, however, the reading device may read the one or more information pieces respectively from the one or more electronic tags located outside the accommodation chamber, for example, when a radio wave from the one or more electronic tags located outside the accommodation chamber passes through the housing or the lid member, or when the lid member is forgotten to be closed. Thus, one or more items (products) which are not objects to be purchased and which are located outside the accommodation chamber may erroneously be detected as objects to be read and may consequently be determined as the objects to be purchased.

In view of the foregoing, it is an object of the present disclosure to provide a reading system, a shopping assistance system, a reading method, and a program with which an item is less likely to be erroneously determined as an object to be read.

A reading system according to one aspect of the present disclosure includes an evaluation value acquirer and a determining processor. The evaluation value acquirer is configured to acquire, with regard to a reading device configured to perform wireless communication with an electronic tag attached to each of one or more items by using a radio wave as a medium to read item information on each of the one or more items, an evaluation value about at least one of: a total number of times; a time interval; or a frequency, of reading the item information for each of the one or more items. The determining processor is configured to determine, for each of the one or more items, whether or not each of the one or more items is an object to be read based on a change in the evaluation value over time.

A shopping assistance system according to one aspect of the present disclosure includes: the reading system; and a checkout system configured to perform a checkout process of the one or more items. The checkout system is configured to perform, based on the piece of item information, a checkout process of the one or more items determined as the object to be read by the determining processor.

A reading method according to an aspect of the present disclosure includes acquiring, with regard to a reading device configured to perform wireless communication with an electronic tag attached to each of one or more items by using a radio wave as a medium to read item information on each of the one or more items, an evaluation value about at least one of: a total number of times; a time interval; or a frequency, of reading item information on each of the one or more items. The reading method includes determining, for each of the one or more items, whether or not each of the one or more items is an object to be read based on a change in the evaluation value over time.

A program according to an aspect of the present disclosure is a program configured to cause a computer system to execute a process of acquiring, with regard to a reading device configured to perform wireless communication with an electronic tag attached to each of one or more items by using a radio wave as a medium to read item information on each of the one or more items, an evaluation value about at least one of: a total number of times; a time interval; or a frequency, of reading item information, for each of the one or more items. The program is a program configured to cause the computer system to execute a process of determining, for each of the one or more items, whether or not each of the one or more items is an object to be read based on a change in the evaluation value over time.

BRIEF DESCRIPTION OF DRAWINGS

FIGS. 15A to 15F are views each illustrating operation of the shopping assistance system according to the fourth embodiment.

DESCRIPTION OF EMBODIMENTS

First Embodiment (1) Schema

Figure 1:
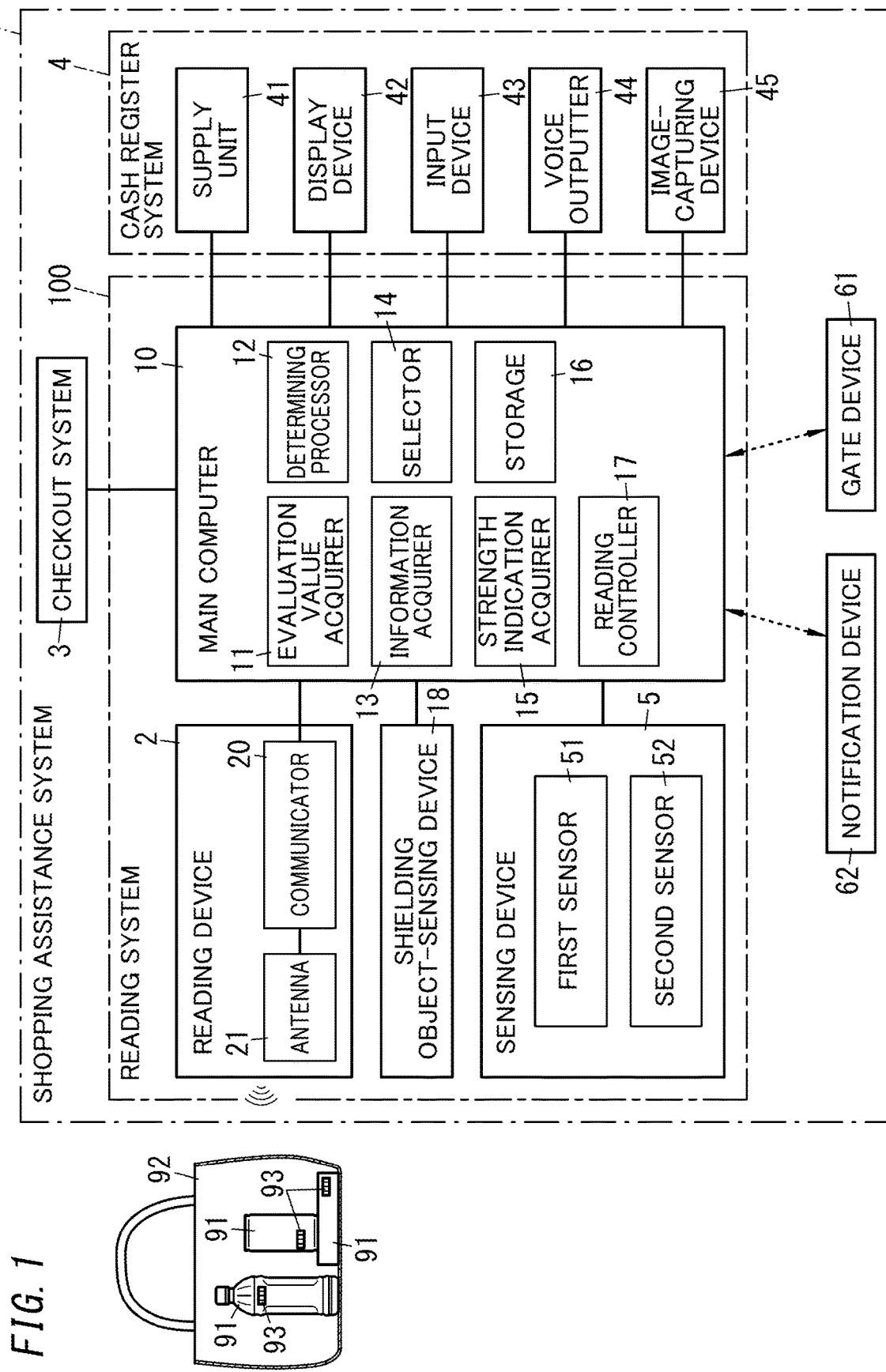
FIG. 1 is a block diagram schematically illustrating a configuration of a shopping assistance system according to a first embodiment.

As illustrated in FIG. 1, a reading system 100 according to the present embodiment is a system used for reading item information from an electronic tag 93 attached to at least one item 91. When a reading device 2 reads item information on an item 91, the reading system 100 determines whether or not the item 91 is an object to be read.

The reading device 2 is a device configured to perform wireless communication with the electronic tag 93 attached to the at least one item 91 by using a radio wave as a medium to read item information on the at least one item 91. That is, the reading device 2 does not read item information directly from an item 91 but is configured to read the item information in a non-contact manner from an electronic tag 93 attached to the item 91. In the present embodiment, the reading device 2 is one of components included in the reading system 100, but the reading device 2 does not have to be included in the components of the reading system 100. That is, in the present embodiment, the reading system 100 is provided with the reading device 2.

As used herein, the "item information" is information for identifying an item 91 and may be a product identification code such as a Japanese Article Number (JAN) code used in Japan. Examples of the product identification code include Electronic Product Code (EPC), a European Article Number (EAN) code in Europe and the like, and Universal Product Code (UPC) in USA and the like in addition to the JAN code. Moreover, the item information is not limited to the information identifying the product type (kind) of each of the items 91 but may include information such as serial information individually identifying each of the items 91 of an identical product type. Thus, in the case of items 91 of an identical product type, the items 91 of the identical product type are individually identifiable based on the item information.

Moreover, the "object to be read" as mentioned herein means any item 91 whose item information is to be read by the reading system 100, and no, one, or a plurality of items 91 of items 91 whose pieces of item information have been read by the reading device 2 are the "objects to be read". That is, not all of the items 91 whose pieces of item information have been read by the reading device 2 are necessarily the "objects to be read", and items 91 whose pieces of item information have been read by the reading device 2 may not always correspond to items 91 which are the "objects to be read". For example, when pieces of item information on ten items 91 have been read by the reading device 2, zero to ten items 91 out of the ten items 91 are the "objects to be read" by the reading system 100. That is, of the ten items 91 whose pieces of item information have been read by the reading device 2, no item 91 may be the "object to be read", or one to ten items 91 may be the "objects to be read".

In sum, since the reading device 2 is configured to read item information on an item 91 by performing wireless communication with an electronic tag 93 of the item 91 by using a radio wave as a medium, the reading device 2 may read item information on an item 91 which is not the "object to be read" by the reading system 100. For example, when an item 91 which is not the "object to be read" is present in the vicinity of an item 91 which is the "object to be read" by the reading system 100, the reading device 2 may read not only the item information on the item 91 which is the "object to be read" but also the item information on the item 91 which is not the "object to be read". In such a case, the reading system 100 according to the present embodiment determines whether or not an item 91 is the object to be read, and therefore, the item 91 which is the object to be read can be selected from the items 91 whose pieces of item information have been read by the reading device 2.

The reading system 100 according to the present embodiment is configured as described below to implement a function of determining whether or not an item 91 is the object to be read. That is, the reading system 100 includes an evaluation value acquirer 11 and a determining processor 12 as illustrated in FIG. 1. The evaluation value acquirer 11 is configured to acquire an evaluation value about at least one of: the number of times; a time interval; or a frequency, of reading item information for each of one or more items 91 by a reading device 2. The determining processor 12 is configured determine, for each of the one or more items 91, whether or not each of the one or more items 91 is the object to be read based on a change in the evaluation value over time.

That is, in the reading system 100 according to the present embodiment, the items 91 are determined one by one whether or not each item 91 is the object to be read based on a time-course change in the evaluation value acquired by the evaluation value acquirer 11. As used herein, the "evaluation value" is a value relating to at least one of the number of times, a time interval, or a frequency of reading item information by the reading device 2 in a prescribed time period. Here, the item 91 which is the "object to be read" by the reading system 100 is assumed to be disposed at a location (e.g., in a prescribed area near the reading device 2) where the item information on the item 91 is easily read by the reading device 2. For the item 91 disposed in the location where reading is easily performed, the success rate of reading item information by the reading device 2 increases as compared to that for other items 91, and consequently, the "evaluation value" such as the number of times or the like of reading the item information by the reading device 2 changes. Thus, the reading system 100 can distinguish the item 91 which is the "object to be read" from other items 91 by analyzing the change in the evaluation value over time.

Incidentally, in the present embodiment, the reading system 100 is, together with a checkout system 3, included in a shopping assistance system 1. The checkout system 3 is a system configured to perform a checkout process of one or more items 91. In other words, the shopping assistance system 1 according to the present embodiment includes the reading system 100 and the checkout system 3 configured to perform the checkout process of the one or more items 91.

The shopping assistance system 1 is a system which is introduced into retail stores to assist customers 90 (see FIG. 6) in purchasing (i.e., "shopping") products. Examples of the retail stores include convenience stores, supermarkets, department stores, drugstores, electronics retail stores, hardware stores, and the like. Therefore, when the shopping assistance system 1 introduced into a retail store uses the reading system 100, an item 91 whose item information is read by the reading system 100 is a "product" sold in the retail store, and the item information on the item 91 (the product) is "product information".

When the reading system 100 is used in the shopping assistance system 1, the item information read by the reading device 2 is used for, for example, the checkout process performed by the checkout system 3. In such a case, the "object to be read" is equal to an "object to be purchased", that is, the "object to be read" is identical to an "object to be purchased". As used herein, the "object to be purchased" means an item 91 as an object to be purchased by a customer 90. As used herein, "purchase" refers to actions taken by a buyer (customer) of actions (sales and purchase) of transferring the ownership of one or more items 91 from a seller (store) to the buyer (customer) and paying the seller the consideration (charge) for the one or more items 91 by the buyer. That is, completion of a checkout process of an item 91 as an object to be purchased basically means that the ownership of the item 91 is transferred from the seller (store) to the buyer (customer), and the customer 90 may bring back the item 91.

That is, the checkout system 3 is configured to perform, based on one or more pieces of item information, the checkout process respectively of one or more items 91 determined, by the reading system 100, as the objects to be read. In other words, the checkout system 3 executes the checkout process of only one or more items 91 of items 91 whose pieces of item information have been read by the reading device 2 and which have been determined as items 91 which are the objects to be read (objects to be purchased) by the reading system 100. Thus, in the shopping assistance system 1, the object(s) to be read by the reading system 100, that is, only one or more items 91 which are objects to be purchased are easily subjected to the checkout process, and one or more items 91 which are not objects to be purchased are less likely to be erroneously included in the objects to be subjected to the checkout process.

In the shopping assistance system 1, the reading device 2 installed, for example, at a checkout counter 8 (see FIG. 2) in a retail store reads item information on an item 91 in a non-contact manner, thereby achieving a state where checkout of the item 91 is possible. Therefore, for example, it is possible to collectively read a plurality of pieces of item information on a plurality of items 91, and it is possible to read a piece of item information also in a state where at least one item 91 is in a shopping bag (a so-called plastic shopping bag) or the like. Accordingly, it is possible to save labor that has to be performed by a sales clerk and a customer 90 for shopping by the customer 90 as compared to a case where item information is read from, for example, a barcode.

In this embodiment, in the shopping assistance system 1 according to the present embodiment, it is determined, for each of one or more items 91, whether or not each of the one or more items 91 is the object to be read (the object to be purchased) based on a change in an evaluation value over time of at least one of the number of times, a time interval, or a frequency of reading item information by the reading device 2. That is, the shopping assistance system 1 acquires, by the evaluation value acquirer 11, the evaluation value about at least one of: the number of times; a time interval; or a frequency, of reading item information when the reading device 2 reads the item information by wireless communication with the electronic tags 93 attached to each of the one or more items 91. Then, in the shopping assistance system 1, the determining processor 12 determines, for each of the one or more items 91, whether or not each of the one or more items 91 is the object to be read (the object to be purchased) based on a change (time-course change) in the evaluation value.

For example, when the reading device 2 is installed at the checkout counter 8 in a retail store, a customer 90 picks up at least one item 91 as an object to be read from a plurality of items 91 displayed in the retail store, brings the at least one item 91 to the checkout counter 8, and puts the at least one item 91 in a prescribed area on the checkout counter 8. Due to a series of such actions taken by the customer 90, the distance from the reading device 2 to the object to be read decreases as the customer 90 holding the object to be read (the at least one item 91) approaches the checkout counter 8, and after the object to be read is put in the prescribed area, the distance from the reading device 2 to the object to be read is fixed. Thus, along with a series of actions taken by the customer 90 as described above, the evaluation value about at least one of: the number of times; a time interval; or a frequency, of reading item information by the reading device 2 shows a specific variation pattern regarding each of the one or more items 91 which is the object to be read (the object to be purchased). For example, the number of times of reading the item information on an item 91 which is the object to be read (the object to be purchased) significantly increases after the item 91 is put in the prescribed area as compared to that before the item 91 is put in the prescribed area. Thus, the shopping assistance system 1 is configured to identify the at least one item 91 put in the prescribed area as a product to be read (the object to be purchased) by analyzing the change in the evaluation value over time.

Thus, in the shopping assistance system 1, for example, the reading device 2 may read pieces of item information on items 91 which are, for example, items 91 displayed in the vicinity of the checkout counter 8 and which are not objects to be read, but the at least one item 91 as the object to be read can be distinguished from these items 91. Then, in the shopping assistance system 1, only the at least one item 91 identified as the object to be read is subjected to, for example, a checkout process performed by the checkout system 3, thereby suppressing the items 91 which are not the objects to be read from being subjected to the checkout process. In sum, the checkout system 3 is configured to perform the checkout process based on the item information read by the reading device 2 at least while the at least one item 91 is in the prescribed area. Thus, the shopping assistance system 1 provides the advantage that even though the reading device 2 may read pieces of item information from electronic tags 93 located out of the prescribed area, erroneous determination as objects to be read (objects to be purchased) is less likely to occur.

(2) Configuration

The reading system 100 according to the present embodiment and the shopping assistance system 1 including the reading system 100 will be described in detail below. In the present embodiment, a convenience store is described as an example of the retail store in which the shopping assistance system 1 is introduced.

(2.1) Shopping Assistance System

Herein, the overall structure of the shopping assistance system 1 according to the present embodiment will be first explained. As described above, the shopping assistance system 1 includes the reading system 100 and the checkout system 3 configured to perform the checkout process of one or more items 91.

Figure 2:
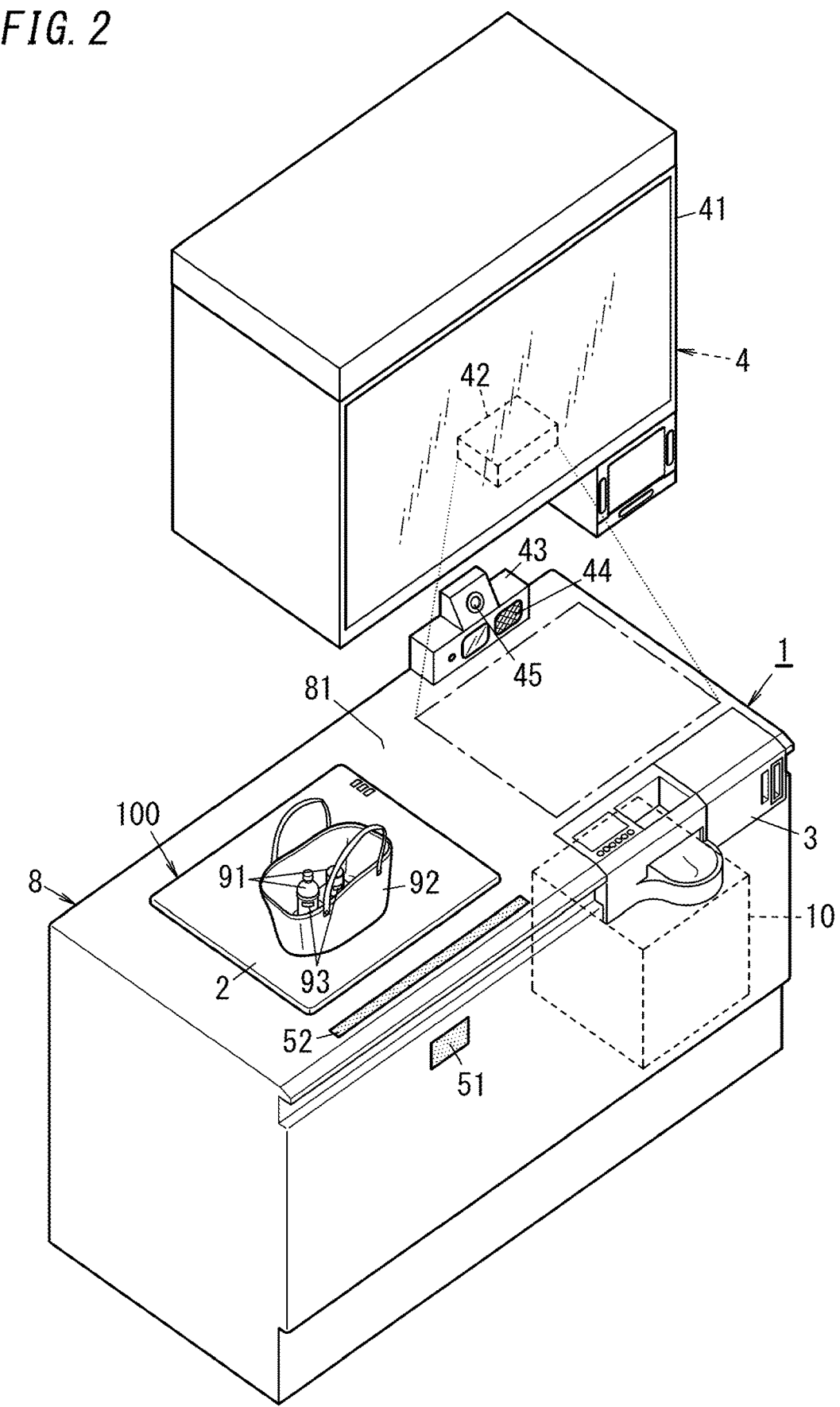
FIG. 2 is an exterior perspective view illustrating a checkout counter to which the shopping assistance system is applied.

As illustrated in FIGS. 1 and 2, the reading system 100 includes a main computer 10 and the reading device 2. However, as described above, it is not essential that the reading device 2 is included in the components of the reading system 100. Moreover, in the present embodiment, the reading system 100 further includes a shielding object-sensing device 18 and a sensing device 5, which are, however, not essential components of the reading system 100. As illustrated in FIGS. 1 and 2, the shopping assistance system 1 further includes a cash register system 4, a gate device 61, and a notification device 62, which are not essential components of the shopping assistance system 1, in addition to the reading system 100 and the checkout system 3.

The main computer 10 includes the evaluation value acquirer 11, the determining processor 12, an information acquirer 13, a selector 14, a strength indication acquirer 15, a storage 16, and a reading controller 17. In the present embodiment, the main computer 10 is a computer system including one or more processors and memory as hardware as main components. In the main computer 10, the one or more processors execute a program stored in the memory to implement functions of the evaluation value acquirer 11, the determining processor 12, the information acquirer 13, the selector 14, the strength indication acquirer 15, and the reading controller 17. The program may be stored in the memory of the main computer 10 in advance, may be provided over a telecommunications network, or may be provided as a non-transitory recording medium such as an optical disc or hard disk drive which stores the program and which is readable by the computer system.

The main computer 10 is connected to the reading device 2 and the checkout system 3. Moreover, the main computer 10 is configured to communicate with a store terminal including, for example, a Point Of Sales (POS) terminal. The information acquirer 13 if the main computer 10 performs, based on item information received from the reading device 2, a prescribed process such as a transmission process of transmitting, to the checkout system 3, information required for the checkout process to be performed by the checkout system 3.

The evaluation value acquirer 11 acquires an evaluation value of each of one or more items 91 at the reading device 2. The evaluation value acquirer 11 acquires, as the evaluation value, a value calculated based on an acquisition condition of the item information from the reading device 2 by the information acquirer 13 described later. In the present embodiment, calculation of the evaluation value based on the acquisition condition of the item information by the information acquirer 13 is assumed to be executed by the evaluation value acquirer 11. The "evaluation value" is, as described above, a value relating to at least one of the number of times, a time interval, or a frequency of reading pieces of item information by the reading device 2 in a prescribed time period. Therefore, when the reading device 2 reads pieces of item information on a plurality of items 91 within an identical time period, the evaluation value acquirer 11 acquires evaluation values in a distinguished manner for the respective items 91. The evaluation value acquirer 11 stores the evaluation values thus acquired in the storage 16 in a distinguished manner for the respective items 91.

Moreover, in the present embodiment, a change in the evaluation value over time is used for determination performed by the determining processor 12 described later, and therefore, the evaluation value acquirer 11 acquires evaluation values in at least two time periods, namely, a first time period P1 (see FIG. 5A) and a second time period P2 (see FIG. 5A) described later. The second time period P2 is a time period set after the end of the first time period P1.

As used herein, "the number of times of reading" means the number of times of reading item information by the reading device 2 within a prescribed time period (the first time period P1 or the second time period P2) and is specifically the number of times of successfully reading the item information by the reading device 2. Thus, when the reading device 2 receives any signal by wireless communication with the electronic tag 93 attached to the item 91 but fails to read item information on the item 91, such a case is not included in targets to be counted as the number of times of reading. For example, when the reading device 2 successfully reads item information on an item 91, that is, identical item information, ten times within a prescribed time period, "the number of times of reading" is "10 times".

As used herein, the "time interval of reading" means a time interval at which the reading device 2 reads item information within a prescribed time period (the first time period P1 or the second time period P2). Specifically, the "time interval of reading" is a time interval between two times of reading of item information when the reading device 2 successfully reads the item information two times, that is, a time from a time point at which the item information is read for a first time to a time point at which the item information is read for a second time. Thus, when the reading device 2 receives any signal by wireless communication with the electronic tag 93 attached to the item 91 but fails to read item information on the item 91, neither a starting point nor an end point of the time interval for reading is defined. For example, when the reading device 2 successfully reads item information on an item 91, that is, identical item information, two times at an interval of 0.05 seconds within a prescribed time period, "the interval of reading" is "0.05 seconds".

As used herein, "the frequency of reading" means the frequency of reading item information by the reading device 2 within a prescribed time period (the first time period P1 or the second time period P2) and is specifically the frequency of successfully reading the item information by the reading device 2. Thus, when the reading device 2 receives any signal by wireless communication with the electronic tag 93 attached to the item 91 but fails to read item information on the item 91, such a case is not included in targets to be counted as the frequency of reading. For example, when the reading device 2 successfully reads item information on an item 91, that is, identical item information, ten times per unit time within a prescribed time period, "the frequency of reading" is "10 times".

The present embodiment describes, for example, a case where the "evaluation value" acquired by the evaluation value acquirer 11 is "the number of times of reading". In the following description, the number of times of reading, which is the evaluation value, is also referred to as "the number of times of reading".

The determining processor 12 is configured determine, for each of the one or more items 91, whether or not the at least one item 91 is the object to be read based on a change in the evaluation value over time. Here, the determining processor 12 analyzes the change in the evaluation value in a determination time period for each of the one or more items 91 and determines, based on an analysis result, whether or not each of the one or more items 91 is the object to be read. In the present embodiment, the determining processor 12 analyzes a changing pattern in the evaluation value in the determination time period stored in the storage 16 of the main computer 10 to determine whether or not each of the one or more items 91 is the object to be read. As used herein, the "determination time period" includes at least two time periods, namely, the first time period P1 and the second time period P2, and is a time period having a finite length (e.g., 10 seconds).

In the present embodiment, the determining processor 12 determines, for each of the one or more items 91, whether or not the at least one item 91 is the object to be read based on whether or not a change amount of the change in the evaluation value over time belongs to a prescribed range. As used herein, the "change amount" means the magnitude of the evaluation value that changes over time. The change amount of the evaluation value from a time period A to a time period B is a difference value between an evaluation value of the time period A and an evaluation value of the time period B. As used herein, the "prescribed range" is a numerical range defined by one or a plurality of thresholds. In the present embodiment, for example, the prescribed range is defined by one threshold. In this case, a range greater than or equal to the threshold is the "prescribed range", and a range less than the threshold is out of the "prescribed range". In this case, when the change amount of the change in the evaluation value over time is greater than or equal to the threshold, the change amount belongs to the prescribed range, and the determining processor 12 determines that the at least one item 91 is the object to be read. In contrast, the change amount of the change in the evaluation value over time is less than the threshold, the change amount does not belong to the prescribed range, and the determining processor 12 determines that the at least one item 91 is not the object to be read. The threshold is set to, for example, "ten times".

Moreover, the determining processor 12 determines, for each of at least one 91, whether or not the at least one item 91 is the object to be read based on a result of a comparison between an evaluation value in the first time period P1 and an evaluation value in the second time period P2 set after the end of the first time period P1. That is, in the present embodiment, the determining processor 12 compares the evaluation values in the two time periods, namely the first time period P1 and the second time period P2, which are shifted from each other in time series, to determine whether or not the at least one item 91 is the object to be read.

The information acquirer 13 acquires pieces of item information on a plurality of items 91 from the reading device 2. When wireless communication with an electronic tag 93 attached to an item 91 is established, the reading device 2 receives, from the electronic tag 93, a piece of item information on the item 91 provided with the electronic tag 93, which will be described later in detail. The information acquirer 13 acquires, from the reading device 2, the piece of item information read (received) in this way by the reading device 2 from the electronic tag 93. Here, when the reading device 2 simultaneously reads pieces of item information on a plurality of items 91, the information acquirer 13 acquires the pieces of item information on the plurality of items 91 one by one. The information acquirer 13 acquires the item information at constant time (for example, 100 milliseconds) intervals from the reading device 2 and stores it in the storage 16.

The selector 14 selects a piece of item information on at least one object to be read from the plurality of pieces of item information based on a determination result by the determining processor 12. That is, when the information acquirer 13 acquires the plurality of pieces of item information on the plurality of items 91 from the reading device 2, the selector 14 selects the piece of item information on the at least one item 91 as the object to be purchased from the plurality of pieces of item information. In the present embodiment, since the "object to be read" is equal to the "object to be purchased", the selector 14 selects, as the object to be purchased, item information which is determined, by the determining processor 12, as the object to be read. The selector 14 may select two or more pieces of item information as the pieces of item information on the objects to be purchased.

Moreover, the selector 14 is configured to output the piece of item information on the object to be purchased (the object to be read) to the checkout system 3 configured to perform the checkout process on the at least one item 91. That is, the main computer 10 outputs, to the checkout system 3, the piece of item information which is information on the object to be purchased and which is selected by the selector 14. This enables only the at least one item 91 identified as the object to be read (the object to be purchased) to be subjected to the checkout process performed by the checkout system 3.

The strength acquirer 15 acquires values of Received Signal Strength Indication (RSSI) at a reading device 2 while the reading device 2 performs wireless communication. The strength acquirer 15 acquires values of the received signal strength indication from the reading device 2. Here, when the reading device 2 simultaneously reads pieces of item information on a plurality of items 91, the strength acquirer 15 acquires the value of the received signal strength indication with respect to each of the plurality of items 91. The strength acquirer 15 acquires the values of the received signal strength indication at constant time intervals (for example, 100 milliseconds) from the reading device 2 and stores them in the storage 16 of the main computer 10.

The storage 16 is implemented, for example, as a non-transitory storage medium such as a rewritable nonvolatile semiconductor memory. The storage 16 at least stores the evaluation value acquired by the evaluation value acquirer 11.

The reading controller 17 controls the reading device 2. The reading controller 17 at least outputs an instruction of the start and the end of the wireless communication of the reading device 2 with the electronic tag 93. Specifically, when the reading controller 17 causes the wireless communication to be started between the reading device 2 and the electronic tag 93, the reading controller 17 controls the reading device 2 such that the reading device 2 starts outputting a radio wave for the wireless communication. When the reading controller 17 causes the wireless communication to be ended between the reading device 2 and the electronic tag 93, the reading controller 17 controls the reading device 2 such that the reading device 2 stops outputting the radio wave for the wireless communication.

Specifically, each time the information acquirer 13 receives item information from the reading device 2, the main computer 10 counts, by the evaluation value acquirer 11, the number of times of reading the item information by the reading device 2. For example, when the reading device 2 reads identical item information N times, information representing "N times" as the number of times of reading item information by the reading device 2 is sent from the reading device 2 to the main computer 10 together with the item information. That is, the main computer 10 receives pieces of item information from the reading device 2 at constant time (for example, 100 milliseconds) intervals. When the main computer 10 receives the pieces of item information, the main computer 10 adds up the number of times of reading item information in a prescribed time period (the first time period P1 or the second time period P2) for each piece of item information and stores the total number of times in the storage 16. Moreover, the main computer 10 divides the total number of times of reading by the time length of a prescribed time period (the first time period P1 or the second time period P2) to obtain the number of times of reading per unit time (e.g., one second), that is, an average value of the number of times of reading in the prescribed time period (the first time period P1 or the second time period P2).

Thus, the storage 16 of the main computer 10 stores, for example, as shown in Table 1 below, the number of times of reading per unit time (i.e., the average value of the number of times of reading) as the evaluation value for each item 91, that is, for each of the pieces of item information ("aaaa", "bbbb", "cccc"). Here, "change amount (P2-P1)" in Table 1 shows the change amount of the evaluation value from the first time period P1 to the second time period P2, specifically, a difference value between the number of times of reading item information in the second time period P2 and the number of times of reading item information in the first time period P1. For example, for the item information "bbbb", the number of times of reading in the first time period P1 is "10" whereas the number of times of reading in the second time period P2 is "32", and therefore, the difference value therebetween is "22" (=32-10). Thus, the evaluation value (the number of times of reading) stored in the storage 16 of the main computer 10 is deleted when the determination time period elapses, when item information is not received for a prescribed time or longer, or the like.

TABLE 1

| Item Information | Number Of Times Of Reading | | Change Amount (P2 − P1) |
|---|---|---|---|
| | First Time Period P1 | Second Time Period P2 | |
| aaaa | 12 | 11 | −1 |
| bbbb | 10 | 32 | 22 |
| cccc | 20 | 22 | 2 |

Based on the evaluation value (the number of times of reading) during the determination time period stored in the storage 16 for each of the pieces of item information as illustrated in Table 1, the determining processor 12 in the main computer 10 analyzes a change in the evaluation value in the determination time period for each item 91. The determining processor 12 compares an analysis result with a prescribed determination condition to determine whether or not each item 91 is the object to be read. As used herein, the "determination condition" means a condition based on which the determining processor 12 determines that an item 91 is the object to be read. In the present embodiment, the determination condition includes a first condition relating to a change in the evaluation value over time and a second condition relating to the values of the received signal strength indication, which will be described in detail later. That is, the determining processor 12 is configured to determine whether or not an item 91 is an object to be read based on a combination of the change in the evaluation value over time and the received signal strength indication.

Therefore, when receiving item information from the reading device 2 by the information acquirer 13, the main computer 10 acquires, together with the item information, values of the received signal strength indication from the reading device 2 by the strength acquirer 15. That is, the main computer 10 receives combinations of pieces of item information and the values of the received signal strength indication from the reading device 2 at constant time (for example, 100 milliseconds) intervals. When the main computer 10 receives the combinations of pieces of item information and the received signal strength indication, the main computer 10 stores, in the storage 16, received signal strength indication corresponding to the determination time period for each of the pieces of item information. As a result, the storage 16 of the main computer 10 stores, for each item 91, that is, for each piece of item information, the values of the received signal strength indication in addition to the evaluation value (the number of times of reading), for example, as shown in Table 1.

The first condition includes, for example, that the evaluation value increases from the first time period P1 to the second time period P2 and that the change amount of the evaluation value from the first time period P1 to the second time period P2 (i.e., the difference value between the evaluation value in the first time period P1 and the evaluation value in the second time period P2) is greater than or equal to the threshold. The second condition includes, for example, that the value of the received signal strength indication during at least second time period P2 is greater than or equal to a strength threshold.

If both the first condition relating to the change in the evaluation value over time and the second condition relating to the value of the received signal strength indication are satisfied, the determining processor 12 determines that the determination condition is satisfied. That is, if one of the first condition and the second condition is not satisfied, the determining processor 12 determines that the determination condition is not satisfied. The determining processor 12 determines that the item 91 is the object to be read when the determining processor 12 determines that the determination condition (both the first condition and the second condition) is satisfied. If the determining processor 12 determines that the item 91 is the object to be read, the selector 14 of the main computer 10 outputs, to the checkout system 3, item information on the item 91 as item information on the object to be purchased (the object to be read).

Moreover, the main computer 10 is configured to communicate with the cash register system 4, the gate device 61, the notification device 62, the shielding object-sensing device 18, and the sensing device 5 to control these devices.

The cash register system 4 includes a supply unit 41, a display device 42, an input device 43, a voice outputter 44, and an image-capturing device 45. The supply unit 41, the display device 42, the input device 43, the voice outputter 44, and the image-capturing device 45 are each a peripheral device of the main computer 10 and are connected to the main computer 10.

The supply unit 41 is a device configured to supply specific products (for example, cigarettes) to customers 90. The display device 42 is a device configured to display various types of information for customers 90. The input device 43 is a device configured to receive operations given by customers 90 by, for example, gesture detection. Moreover, the input device 43 includes a microphone and has a function of applying voice recognition and semantic analysis to a voice signal input from the microphone. Thus, a voice operation (voice input) by the customer 90 is also possible. The voice outputter 44 includes a loudspeaker and is configured to provide customers 90 with various kinds of information by the voice.

That is, the cash register system 4 uses the display device 42, the input device 43, and the voice outputter 44 as user interfaces to provide customers 90 with various kinds of information by the display or the voice and to receive operations (including voice input) given by the customers 90. Note that such information is represented by at least one of the display or the voice or may be represented by a combination of the display and the voice by the cash register system 4.

For example, the cash register system 4 may provide customers 90 with messages such as "Welcome" and "Thank you very much" respectively at a timing at which a customer is detected and at a timing at which the checkout process is completed. In this way, it is possible to give customers 90 a sense of affinity like clerk service. For example, a customer 90 is to operate the input device 43 to select one of payment methods to pay the checkout amount displayed on the display device 42. The cash register system 4 may also provide customers 90 with a utilization procedure for the shopping assistance system 1 by the display device 42 and the voice outputter 44. In this case, for example, when a customer comes, the display device 42 and the voice outputter 44 preferably explain each step of the utilization procedure sequentially, for example, at first prompt the customer to put an item 91, and then to confirm whether or not the fast food or the cigarettes are purchased, etc.

Moreover, the image-capturing device 45 is a camera which captures images of a space in front of the checkout counter 8 (see FIG. 2) and a space above an upper surface 81 (see FIG. 2) of the checkout counter 8. For example, the image-capturing device 45 captures an image of a customer 90 when the customer 90 is present in front of the checkout counter 8, and the image-capturing device 45 captures an image of the item 91 when the item 91 is put on the checkout counter 8.

The reading device 2 is a device configured to perform the wireless communication with the electronic tag 93 attached to the item 91 by using a radio wave as a medium to read the item information on the item 91. The reading device 2 includes an antenna 21 and a communicator 20. The reading device 2 has a rectangular plate shape, which will be described later in detail. Basically, in a state where the item 91 is put in the prescribed area defined on a surface (upper surface) of the reading device 2, the reading device 2 performs wireless communication with the electronic tag 93 attached to the item 91 and reads the item information. The electronic tag 93 is a Radio Frequency (RF) tag, and the reading device 2 does not read item information directly from the item 91 but reads the item information in a non-contact manner from the electronic tag 93 attached to the item 91.

In the present embodiment, the reading device 2 reads piece of item information from an electronic tag 93 attached to at least one item 91 in a state where the at least one item 91 is stored (bagged) in a container 92 (see FIG. 2). Thus, a customer 90 picks up at least one item 91 in a retail store and stores the picked up item 91 in the container 92 and then, puts the container 92 containing the item 91 in the prescribed area on the reading device 2, thereby causing the reading device 2 to read the piece of item information. Accordingly, the customer 90 does not have to perform bagging after reading of the piece of item information and can bring back to home the container 92 with the at least one item 91 being stored in the container 92, and the shopping assistance system 1 enables shopping to be efficiently performed. As used herein, the "container" is at least a case which is used by a customer 90 to bring at least one product to home, which has a size that allows at least one item 91 to be put in, which has an opening through which at least one item 91 is put in or taken out, and which is, for example, a bag, a basket, a box, or a cart. Here, materials for the bag, the basket, the box, or the cart are not particularly limited, and, examples of the bag include "vinyl bags" made of polyethylene, polypropylene, or the like and "paper bags" made of paper.

In particular, in the present embodiment, the container 92 is assumed to be a personal bag (including, for example, a reusable shopping bag) of a customer 90. Thus, the customer 90 may store the at least one item 91 in the container 92 when the customer 90 picks up the at least one item 91, and therefore, it is possible to simultaneously perform picking up and bagging of the at least one item 91. Thus, the shopping assistance system 1 no longer requires the action "bagging" alone and thus can further improve the efficiency of shopping. However, it is not essential for the shopping assistance system 1 that the customer 90 simultaneously performs picking up of the at least one item 91 and bagging of the at least one item 91. For example, the customer 90 may bag the at least one item 91 after picking up the at least one item 91 until the checkout process is started, or the customer 90 may bag the at least one item 91 after the checkout process.

Moreover, as illustrated in FIG. 2, when a plurality of items 91 are stored in the container 92, the reading device 2 can collectively read pieces of item information on the plurality of items 91 from a plurality of electronic tags 93 attached to the plurality of items 91. Here, the reading device 2 may collectively acquire the plurality of pieces of item information from the plurality of electronic tags 93 or may acquire the pieces of item information one by one. Thus, when the customer 90 once stores the plurality of items 91 in the container 92, the plurality of items 91 are then handled collectively, without being handled as individual items, until the checkout process is completed, and the customer 90 brings the plurality of items 91 to home.

In a similar manner to the reading device 2, the gate device 61 is configured to perform wireless communication with an electronic tag 93 attached to an item 91 by using a radio wave as a medium to read item information. The gate device 61 is installed at, for example, an exit/entrance 101 (see FIG. 3) of a retail store which is a sales space. The gate device 61 is configured to wirelessly perform two-way communication with the main computer 10 by using a radio wave as a medium. When the customer 90 passes through the exit/entrance 101 to go out of the retail store (exits the retail store), the gate device 61 communicates, in a non-contact manner, with the electronic tag 93 attached to the at least one item 91 in the container 92 held by the customer 90. At this time, it is determined whether or not the checkout process has been performed on the piece of item information read by the gate device 61 from the electronic tag 93. In the present embodiment, whether or not the checkout process of the at least one item 91 has been completed is determined, for example, based on the value of a checkout completion flag stored in association with the piece of item information in the storage 16 of the main computer 10. For example, if the checkout process of an item 91 has been completed, the value of the checkout completion flag for the item 91 is "1". Thus, when the checkout completion flag corresponding to the piece of item information read from the electronic tag 93 by the gate device 61 is "0", it is determined that the checkout process is incomplete, and when the checkout completion flag corresponding to the piece of item information is "1", it is determined that the checkout process is completed.

The notification device 62 executes a notification process when the piece of item information read by the gate device 61 is not subjected to the checkout process. That is, with the gate device 61 and the notification device 62, it is possible to confirm that the checkout process of an item 91 which is about to be brought out of the retail store has normally been completed. The notification device 62 is formed integrally with the gate device 61, for example. Modes of notification performed by the notification device 62 are not particularly limited, but, for example, the notification device 62 itself may perform the notification by display or voice, or the notification device 62 may transmit a notification signal to the main computer 10 to cause the cash register system 4 or the like to perform the notification.

The shielding object-sensing device 18 senses the presence and absence of a shielding object shielding a radio wave between the reading device 2 and the electronic tag 93. When the shielding object-sensing device 18 senses the shielding object, the main computer 10 temporarily interrupts the determining process performed by the determining processor 12, which will be described later in detail. As used herein, the "shielding object" is an object (including a human body) which at least reduces the received signal strength indication of a radio wave from the electronic tag 93 at the reading device 2 and which does not have to completely shield the radio wave. Specific examples of the shielding object include a person (including a customer 90) and an object (a hand truck or the like) that passes between the reading device 2 and an item 91 (electronic tag 93). The shielding object-sensing device 18 is provided, for example, as a motion detector (for example, pyroelectric sensor, or image sensor) configured to sense a person who passes in front of the checkout counter 8. Alternatively, the shielding object-sensing device 18 may be provided, for example, as an objective sensor (for example, optical sensor or radio wave sensor) configured to sense an object that passes in front of the checkout counter 8. The shielding object-sensing device 18 may also serve as the image-capturing device 45 of the cash register system 4.

The sensing device 5 senses the location of the item 91. At a timing at which the sensing device 5 senses that an item 91 enters an area at a prescribed distance from the checkout counter 8 and that the item 91 is put in the prescribed area, the reading device 2 starts wireless communication with the electronic tag 93, which will be described later in detail. That is, the main computer 10 receives a trigger from the sensing device 5 to cause the reading controller 17 to start the wireless communication of the reading device 2 with the electronic tag 93. As used herein, the "prescribed area" means an area in which an item 91 whose item information is to be read by the reading device 2 is to be put, and the "prescribed area" is an area set in, for example, a surface (upper surface) of the reading device 2.

In the present embodiment, the sensing device 5 includes a first sensor 51 and a second sensor 52. The first sensor 51 is implemented as a range sensor configured to measure the distance, for example, from the checkout counter 8 to a customer 90. Specifically, the first sensor 51 is implemented as, for example, a non-contact range sensor. Examples of the non-contact range sensor include an ultrasonic range sensor, an optical range sensor, and a radio range sensor. The first sensor 51 measures the distance from the checkout counter 8 to a customer 90 holding an item 91 to sense that the item 91 enters an area at a prescribed distance from the checkout counter 8. The second sensor 52 is implemented as an object sensor configured to sense, for example, that the item 91 is put in the prescribed area. Specifically, the second sensor 52 is implemented as a non-contact object sensor as a light curtain or an area sensor configured to sense, for example, that a movable object passes through an area in front of the prescribed area. The second sensor 52 senses that an item 91 is put in the prescribed area.

The reading controller 17 controls the reading device 2. The reading controller 17 at least outputs an instruction of the start and the end of the wireless communication of the reading device 2 with the electronic tag 93. Specifically, when the reading controller 17 causes the wireless communication to be started between the reading device 2 and the electronic tag 93, the reading controller 17 controls the reading device 2 such that the reading device 2 starts outputting a radio wave for the wireless communication. When the reading controller 17 causes the wireless communication to be ended between the reading device 2 and the electronic tag 93, the reading controller 17 controls the reading device 2 such that the reading device 2 stops outputting the radio wave for the wireless communication.

Here, as illustrated in FIG. 2, the shopping assistance system 1 is provided, for example, in the periphery of the checkout counter 8 in a retail store. One retail store may be provided with a plurality of checkout counters 8.

In the following description, the checkout counter 8 is installed in an orientation in which the upper surface 81 of the checkout counter 8 is a horizontal surface unless otherwise noted. That is, a direction orthogonal to the upper surface 81 of the checkout counter 8 is the up-down direction (gravity direction). Moreover, in the following description, left and right directions when the checkout counter 8 is viewed from the front is defined as "left and right directions", and a depth direction of the checkout counter 8 is defined as the "forward and rearward directions". Note that these directions are not to limit the directions of the shopping assistance system 1 in use. For example, the shopping assistance system 1 may be used with the upper surface 81 of the checkout counter 8 being slightly tilted to a horizontal surface.

In the example shown in FIG. 2, the main computer 10 is built in the checkout counter 8. In the example shown in FIG. 2, the main computer 10 is built in a location on a right end side when the checkout counter 8 is viewed from the front.

The reading device 2 is disposed on the upper surface 81 of the checkout counter 8 at an area between a central part and a left end in a width direction (left and right directions). Here, the reading device 2 is fixed to a fixed position (on the upper surface 81 of the checkout counter 8). Thus, for example, a customer 90 stands in front of the checkout counter 8 and puts at least one item 91 on the plate-like reading device 2 having a plate shape and installed on the upper surface 81 of the checkout counter 8, and thereby, the customer 90 can cause the reading device 2 to read a piece of item information on the at least one item 91.

The supply unit 41 is suspended from a ceiling to be provided above the checkout counter 8. The display device 42 is fixed to a lower surface of the supply unit 41 and is configured to project an image onto a screen by, for example, a projection mapping technique. Herein, the display device 42 projects an image onto a right region with respect to the reading device 2 in the upper surface 81 of the checkout counter 8 as viewed from the front side of the checkout counter 8. That is, the right region with respect to the reading device 2 in the upper surface 81 of the checkout counter 8 serves as a screen of the display device 42. The input device 43 is on the upper surface 81 of the checkout counter 8 and is disposed behind the screen as viewed from the front side of the checkout counter 8. The input device 43 is provided integrally with the voice outputter 44.

Moreover, the positional relationship, shapes, and the like of components of the shopping assistance system 1 described above are mere examples and may accordingly be modified. For example, when the checkout counter 8 is viewed from the front, the reading device 2 may be disposed on the right side, the main computer 10 may be disposed on the left side, and the checkout counter 8 may have an L-shape in plan view. Alternatively, for example, the reading device 2 may be provided separately from the checkout counter 8.

(2.2) Reading Device

Next, the reading device 2 will be described in detail.

The reading device 2 is configured to read item information from an electronic tag 93 attached to an item 91 to acquire the item information. That is, the reading device 2 performs wireless communication with the electronic tag 93 attached to the item 91 by using a radio wave as a medium to acquire the item information stored in the electronic tag 93.

The electronic tag 93 is, for example, a passive-type RF tag and has memory for storing at least the item information. Herein, a plurality of electronic tags 93 are associated with a plurality of items 91 on a one-to-one basis. Each of the electronic tags 93 stores a piece of item information on a corresponding one of the items 91, and each of the electronic tags 93 is attached to the corresponding one of the items 91.

The electronic tags 93 may be attached to the items 91 at least in a state where the electronic tags 93 are handled together with the items 91, and a specific method of attaching the electronic tags 93 to the items 91 includes various ways. In the present embodiment, for example, the electronic tags 93 are seals and are put on the items 91. Alternatively, for example, the electronic tags 93 may be connected to the items 91 by strings or the like, may be integrated with wrapping materials of the items 91, may be embedded in the items 91, or may be incorporated into the items 91. Alternatively, for example, by using a technique such as an application-type semiconductor, the electronic tags 93 may be formed directly on the items 91 themselves or on surfaces of wrapping materials or the like of the items 91 by printing.

As illustrated in FIG. 2, the reading device 2 according to the present embodiment has a rectangular plate shape and is fixed to the upper surface 81 of the checkout counter 8. The reading device 2 is a reader which includes the antenna 21 and the communicator 20 therein (see FIG. 1) and which is included in a Radio Frequency Identification (RFID) system. The reading device 2 basically performs wireless communication with the electronic tag 93 of the item 91 put in the prescribed area above the reading device 2. In the present embodiment, the reading device 2 is a so-called open-type reading device which is not provided with a shield or the like to reduce leakage of the radio wave from the prescribed area.

The antenna 21 transmits and receives a radio wave which serves as a communication medium between the antenna 21 and the electronic tag 93 located in the prescribed area on the reading device 2 to perform wireless communication. That is, in the present embodiment, the antenna 21 is disposed below the process area so as to be able to transmit and receive the radio wave to and from the process area. The antenna 21 preferably includes an antenna for a circular polarized wave with a polarized wave surface being taken into consideration. The antenna 21 is electrically connected to the communicator 20. The antenna 21 is, for example, a patch antenna, a monopole antenna, an inverted-F antenna, or a slot antenna.

In the present embodiment, the reading device 2 is open type, and therefore, no structure is particularly provided to restrict a range which a radio wave transmitted from the antenna 21 can reach. Thus, a radio wave for communication output from the antenna 21 may reach products which are present out of the prescribed area, such as products disposed in the vicinity of the checkout counter 8, for example. Accordingly, the reading device 2 may read pieces of item information from the products which are present out of the prescribed area, such as the products disposed in the vicinity of the checkout counter 8.

The communicator 20 transmits a radio wave from the antenna 21 to the electronic tag 93 and receives, by the antenna 21, item information from the electronic tag 93 activated by the radio wave. At least when receiving the item information, the communicator 20 measures the received signal strength indication of the wireless signal (radio wave). When receiving the item information from the electronic tag 93, the communicator 20 transmits the received signal strength indication in addition to the item information to the main computer 10.

Moreover, the reading device 2 may include a weight sensor configured to measure the weight of an object put on the reading device 2. In this case, it is possible to determine whether or not an item 91 is on the reading device 2 based on a measurement result by the weight sensor, and therefore, the weight sensor may be used also as the sensing device 5.

(3) Operation

Next, operation of the reading system 100 and the shopping assistance system 1 according to the present embodiment will be described.

(3.1) Overall Operation of Shopping Assistance System

Figure 3:
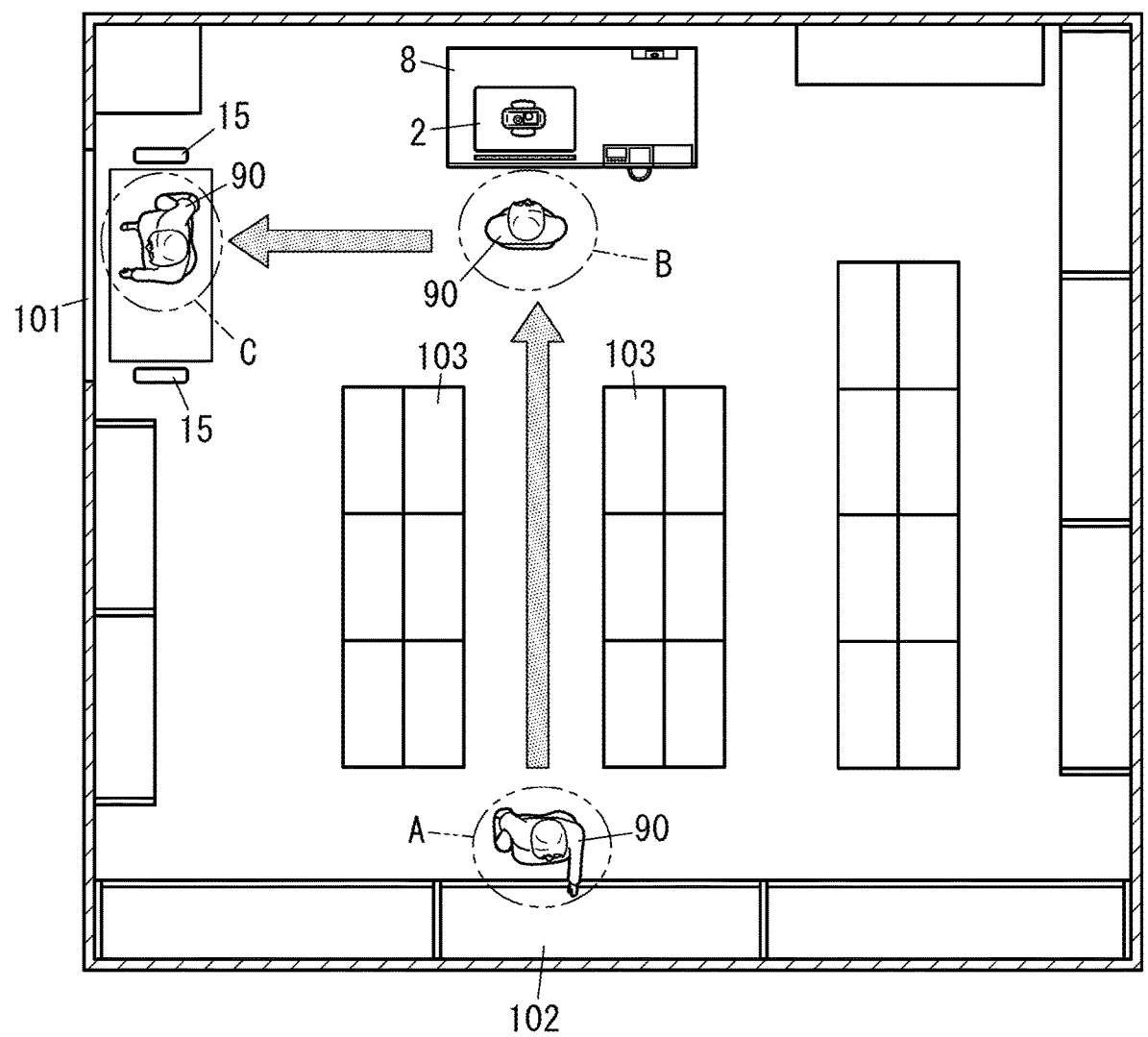
FIG. 3 is a layout of a retail store in which the shopping assistance system is introduced.
Figure 4A:
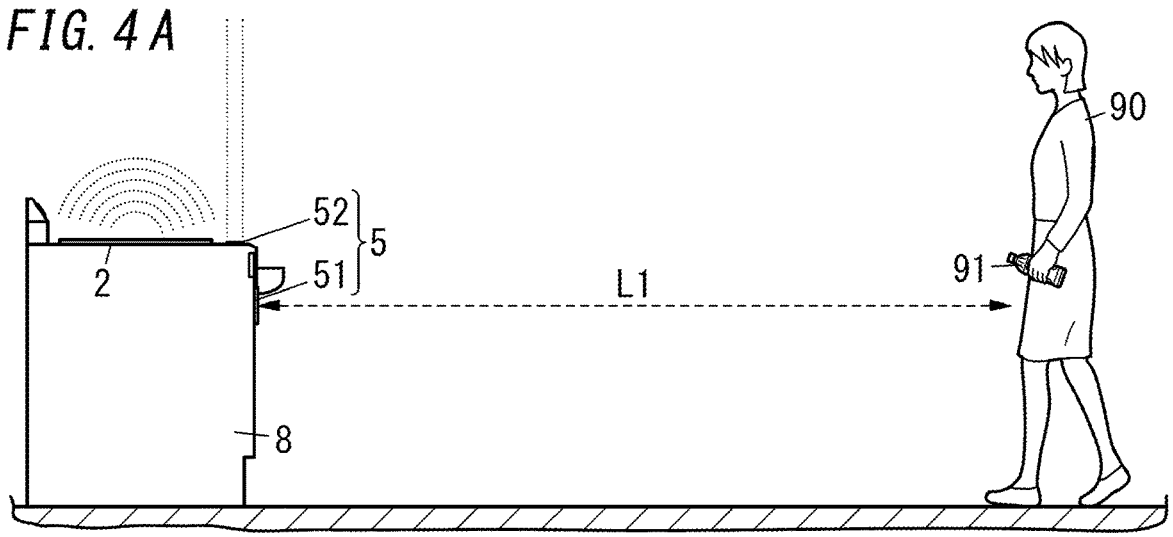
FIGS. 4A to 4C are views each schematically illustrating actions taken by a customer who shops using the shopping assistance system.
Figure 4B:
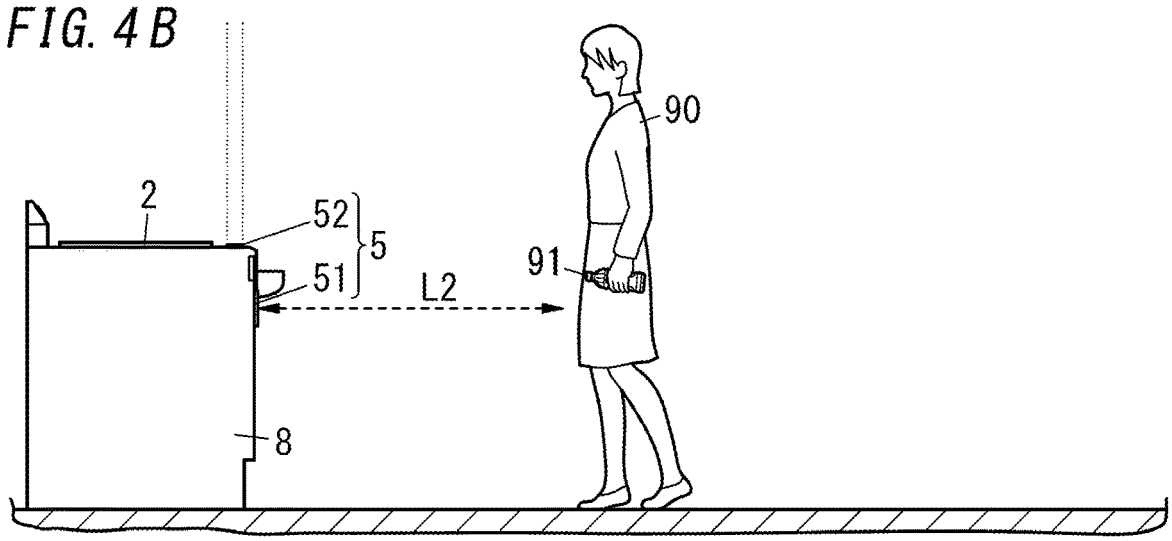
Figure 4C:
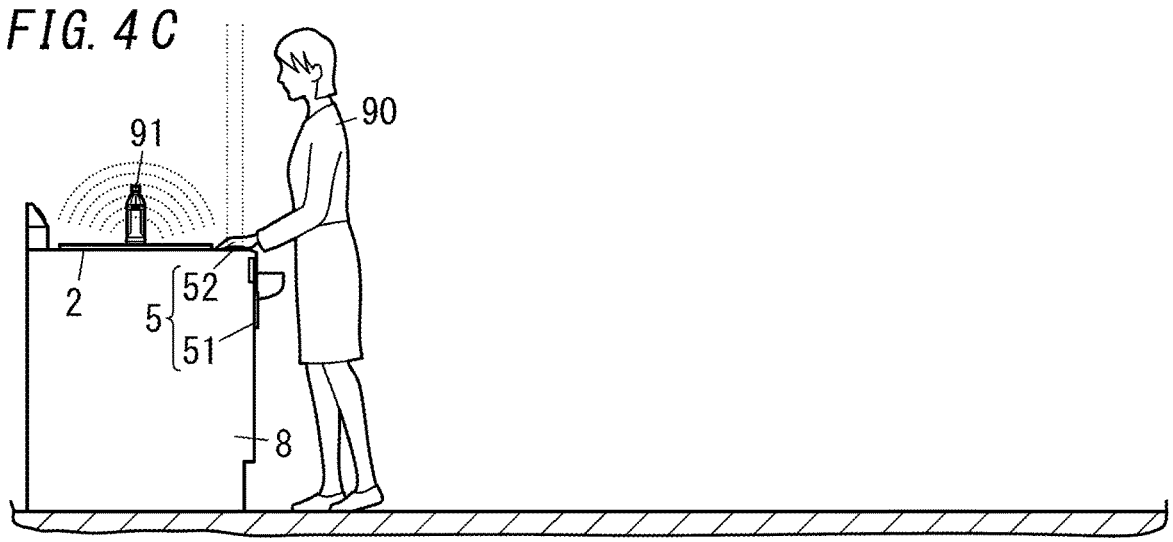
Figure 5A:
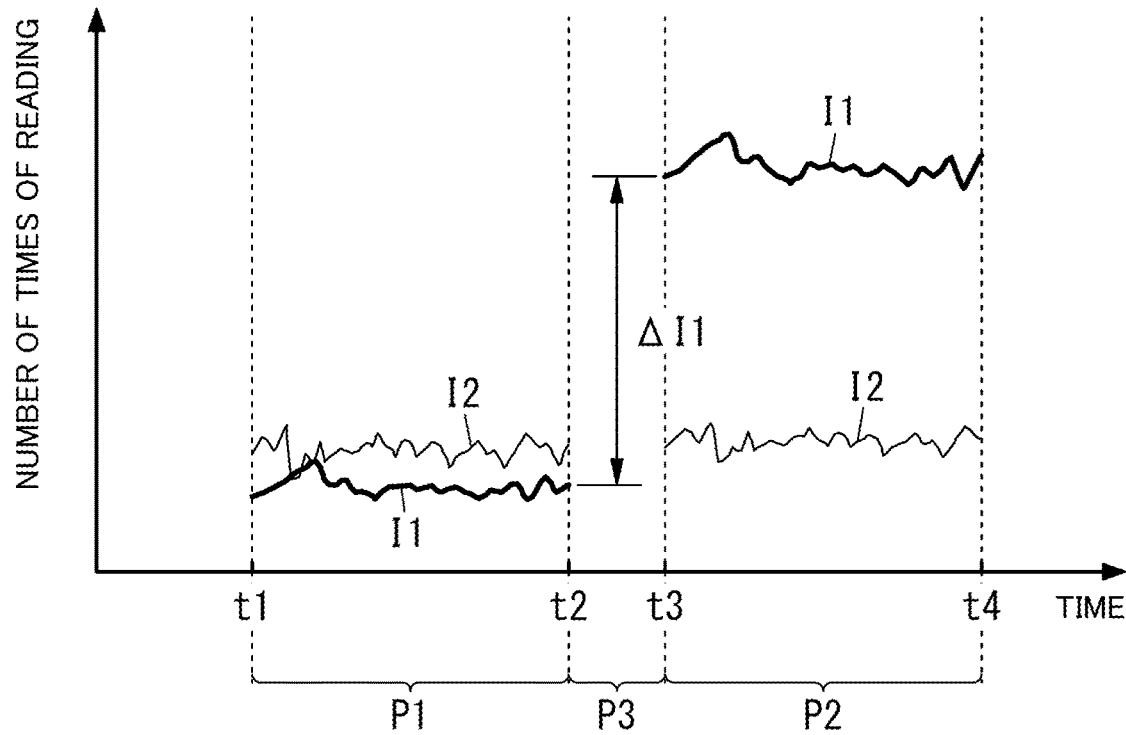
FIG. 5A is a wave form diagram illustrating an example of a change in the number of times of reading over time in the shopping assistance system.
Figure 5B:
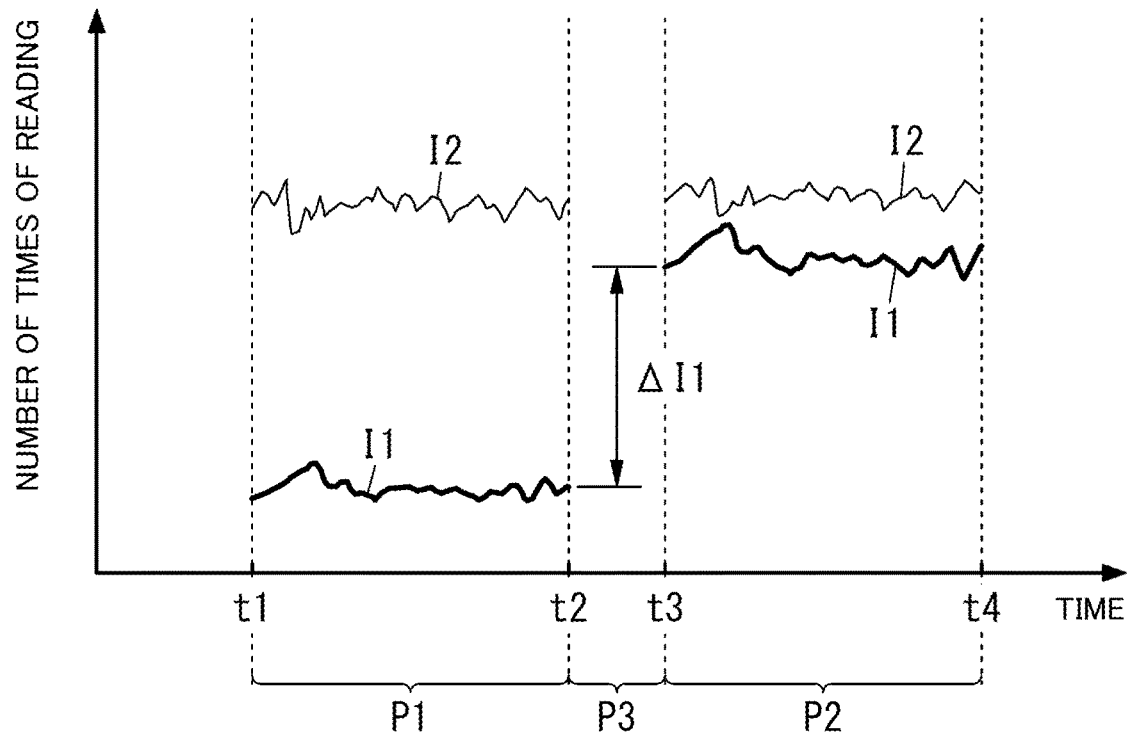
FIG. 5B is a wave form diagram illustrating another example of a change in the number of times of reading over time in the shopping assistance system.
Figure 6:
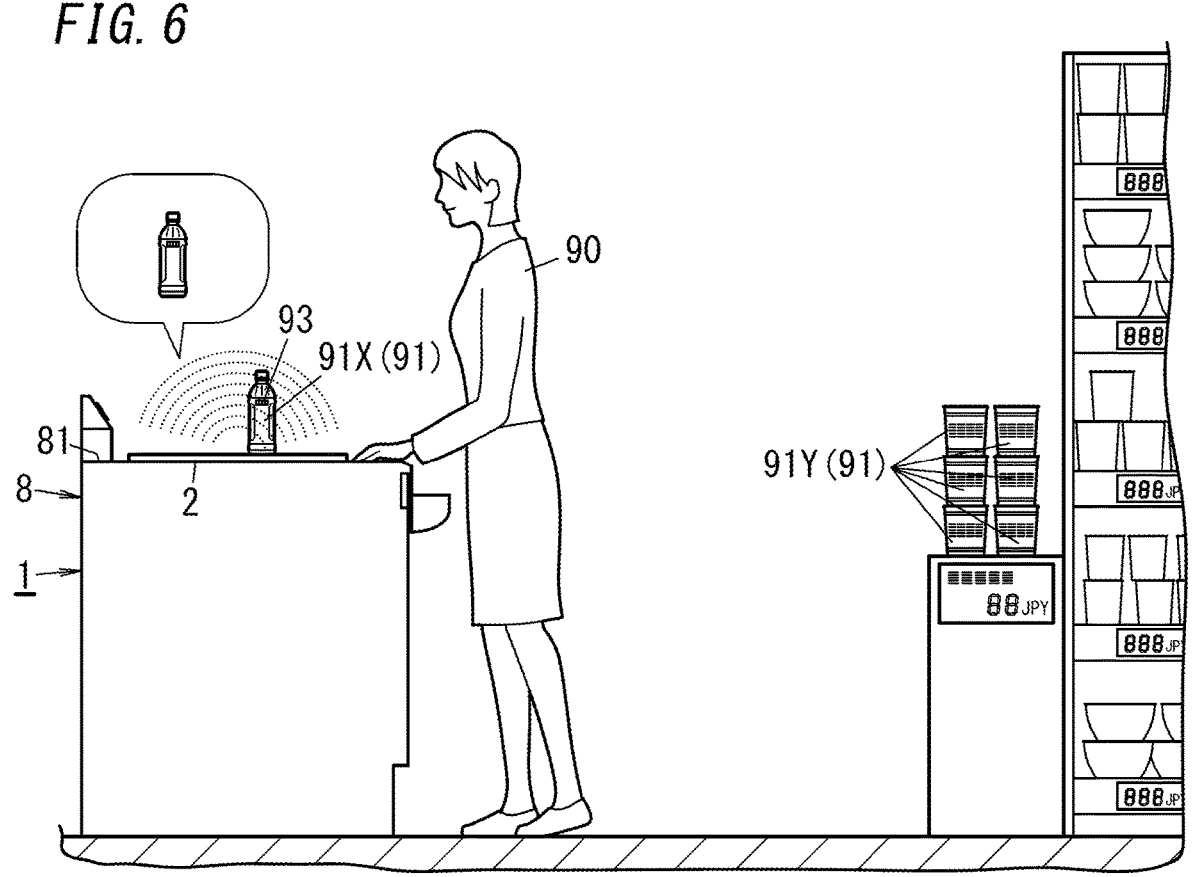
FIG. 6 is a view schematically illustrating actions taken by a customer who shops using the shopping assistance system.
Figure 7A:
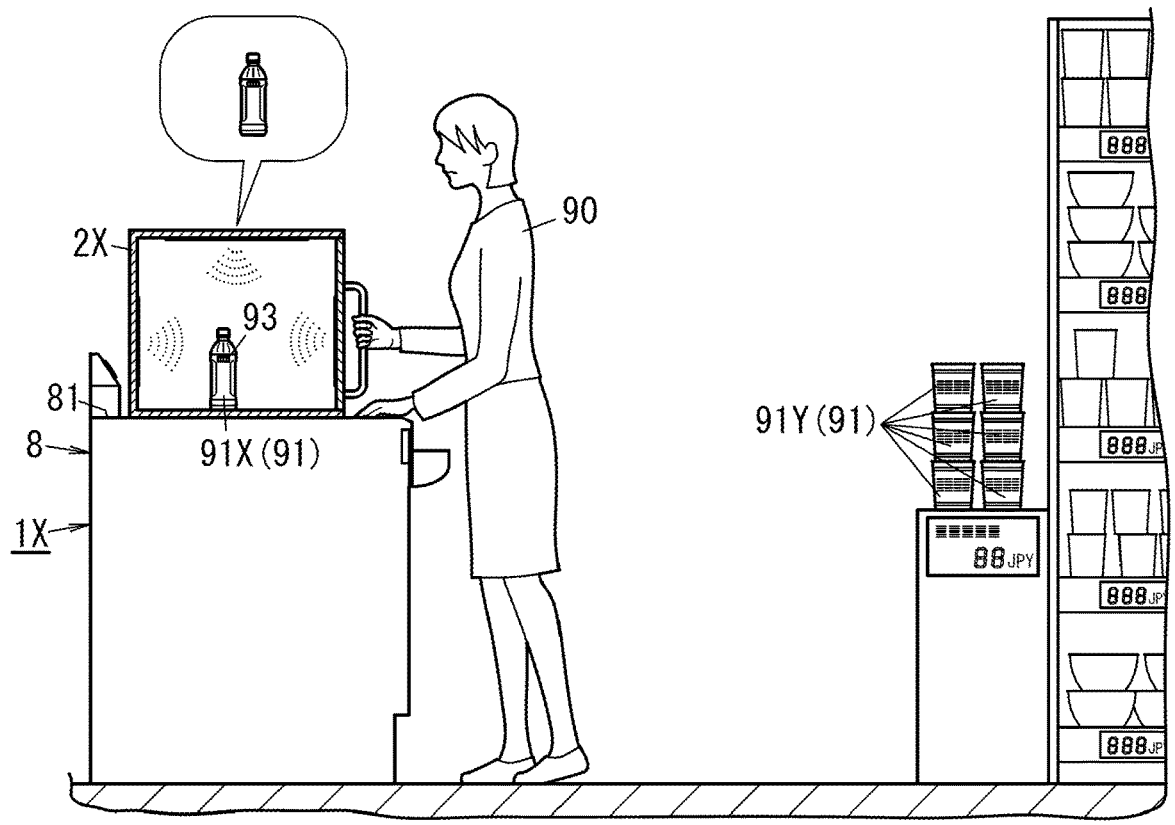
FIG. 7A is a view schematically illustrating actions taken by a customer who shops using the shopping assistance system according to a first comparative example of the first embodiment.
Figure 7B:
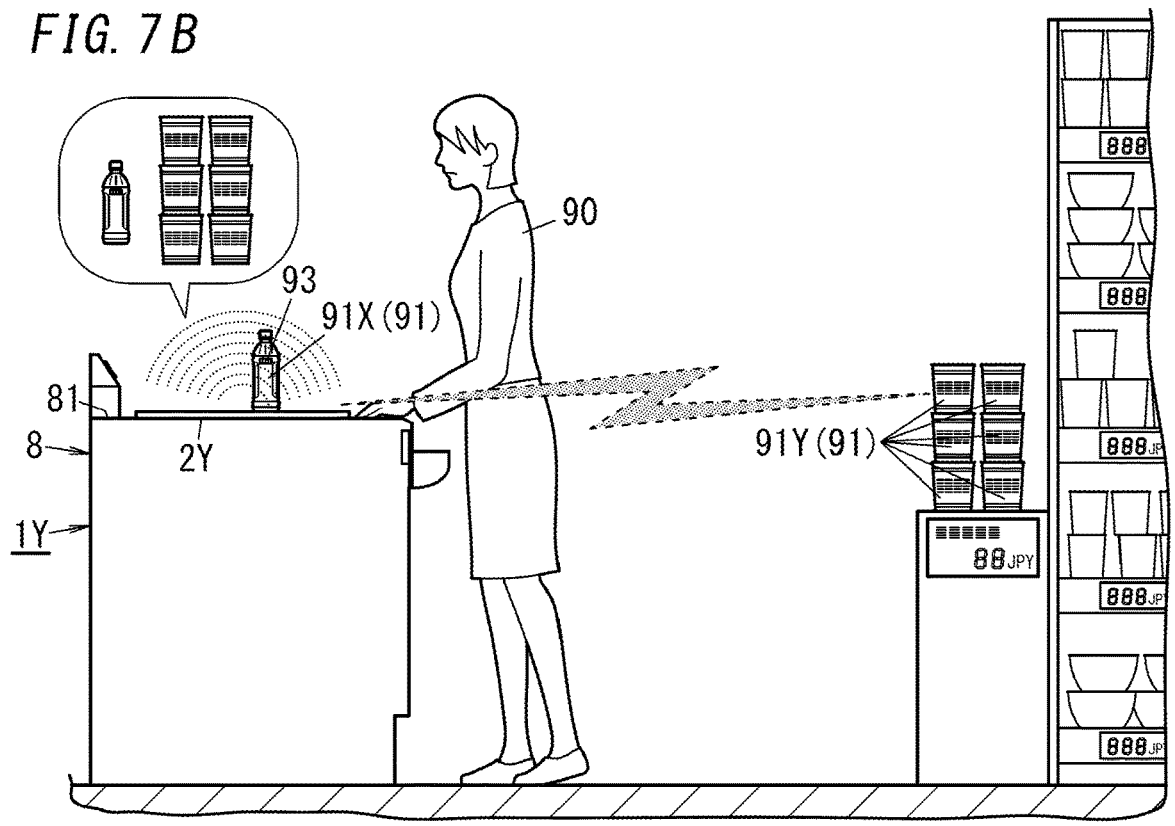
FIG. 7B is a view schematically illustrating actions taken by a customer who shops using the shopping assistance system according to the second comparative example of the first embodiment.
Figure 8:
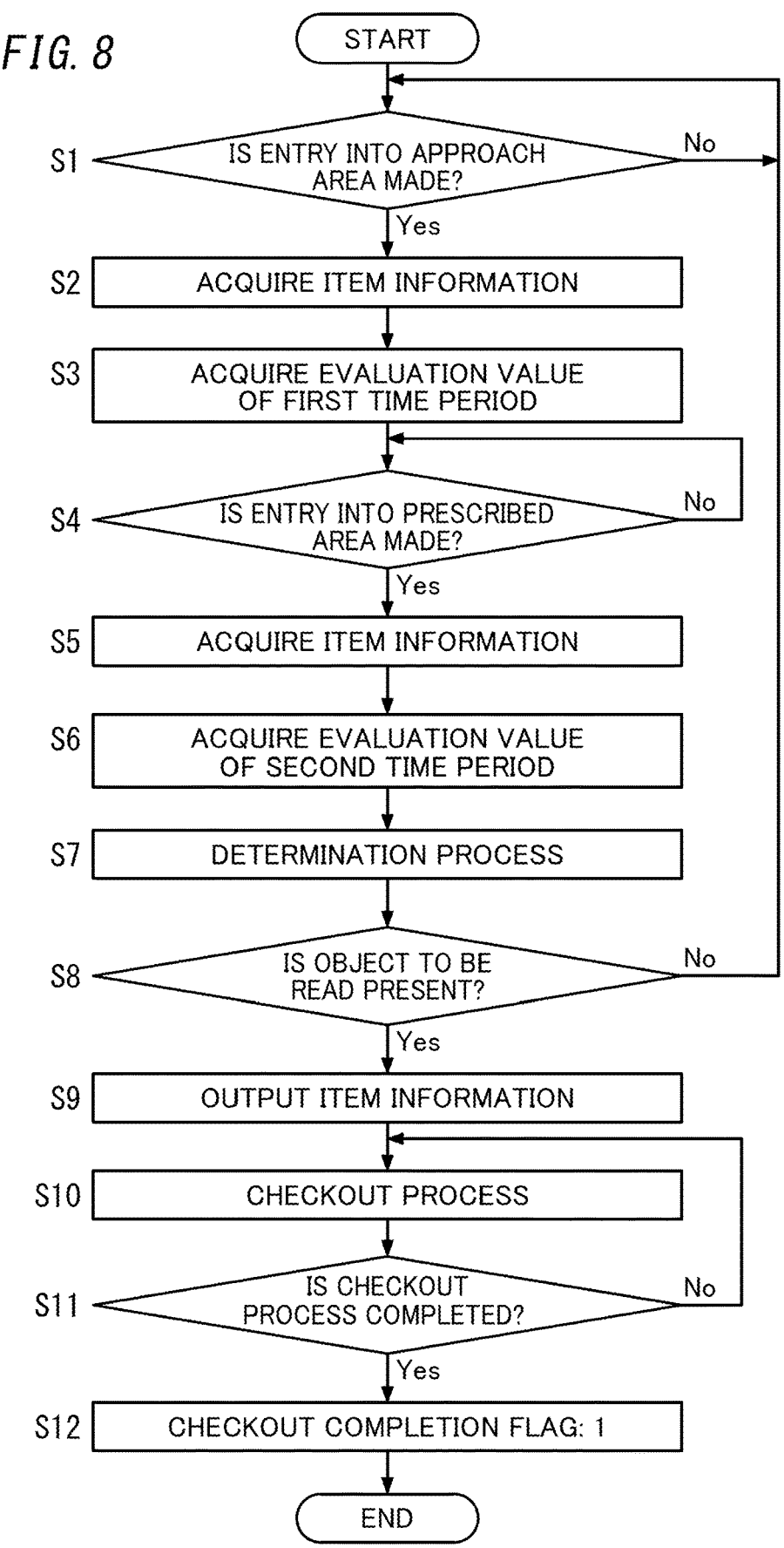
FIG. 8 is a flow chart illustrating operation of the shopping assistance system according to the first embodiment.
Figure 9:
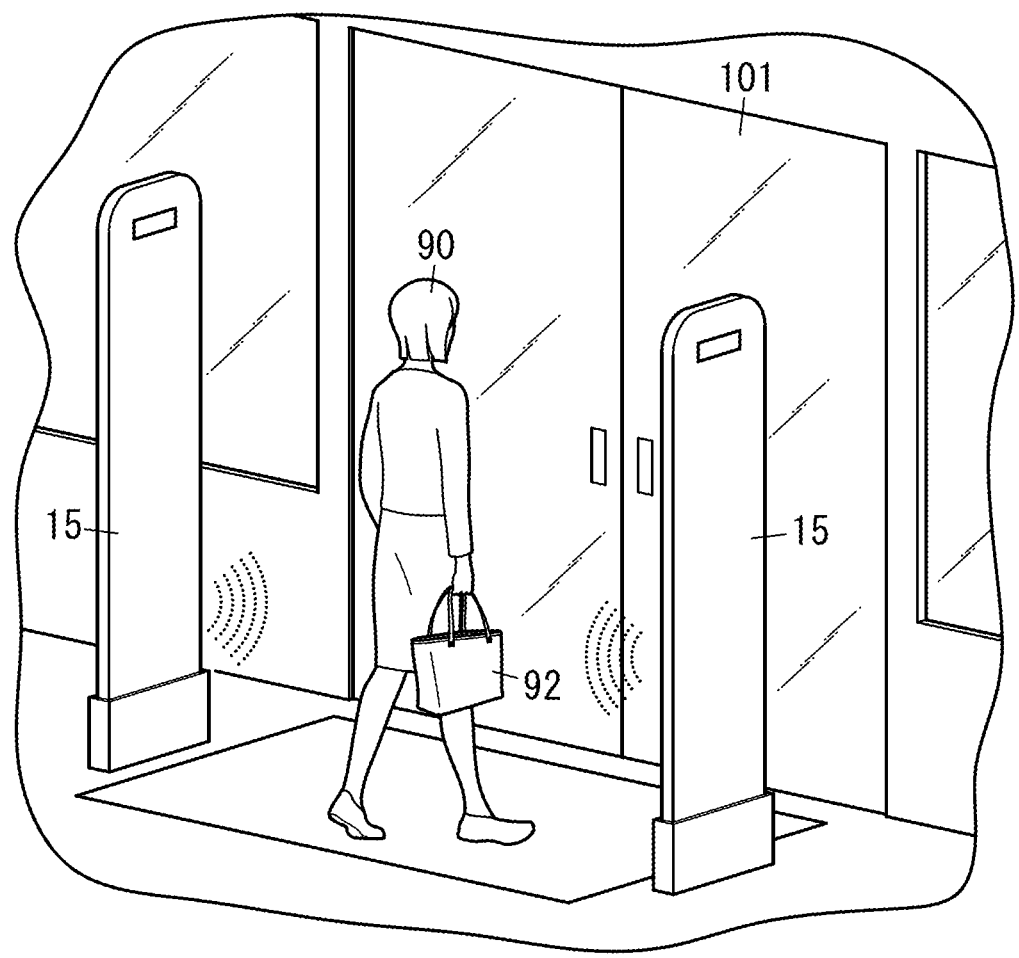
FIG. 9 is a view illustrating actions of a customer leaving a retail store in which the shopping assistance system is introduced.

First of all, with reference to FIGS. 3 to 9, overall operation of the shopping assistance system 1 according to the present embodiment, that is, a shopping assistance method by using the shopping assistance system 1 will be described below. FIG. 3 is a layout of a retail store in which the shopping assistance system 1 is introduced. FIGS. 4A to 4C are views each schematically illustrating that a customer 90 holding an item 91 approaches the checkout counter 8 and puts the item 91 in the prescribed area on the reading device 2. FIGS. 5A and 5B are waveform diagrams each illustrating an example of a change in the number of times of reading over time, where the abscissa represents a time axis, and the ordinate represents the number of times of reading (the number of times of reading which is the evaluation value). FIG. 6 is a view schematically illustrating actions taken by a customer 90 who shops using the shopping assistance system 1. FIGS. 7A and 7B are views schematically illustrating actions taken by a customer 90 who shops using shopping assistance systems 1X and 1Y according to comparative examples, respectively. In FIGS. 4A to 4C, 6, 7A and 7B, the supply unit 41 and the like are accordingly omitted. FIG. 8 is a flow chart showing operation of the shopping assistance system 1. FIG. 9 is a view schematically illustrating actions (at the time of exiting the retail store) taken by a customer 90 who shops using the shopping assistance system 1.

Here, it is assumed, for example, as shown in FIG. 3, the customer 90 picks up, from a refrigerator, an item 91 as an object to be read (an object to be purchased), passes between a pair of racks 103 to bring the item 91 to the checkout counter 8, and puts the item 91 in the prescribed area on the checkout counter 8. It is also assumed that after completion of a checkout process, the customer 90 takes the item 91 away from the checkout counter 8 and passes between a pair of gate devices 61 to exit from the exit/entrance 101. That is, in the example shown in FIG. 3, the customer 90 picks up the item 91 at a location indicated by "A", moves thereafter to a location indicated by "B", and then moves to a location indicated by "C".

In the example shown in FIG. 3, when a customer 90 moves from the location denoted by "A" to the location denoted by "B" and puts the item 91 in the prescribed area on the reading device 2, the sensing device 5 senses a series of actions taken by the customer 90 as illustrated in FIGS. 4A to 4C.

That is, as illustrated in FIG. 4A, the customer 90 approaches the checkout counter 8, and when the distance from the checkout counter 8 to the customer 90 measured by the first sensor 51 of the sensing device 5 becomes "L1", the sensing device 5 determines that the item 91 enters the area at a prescribed distance from the checkout counter 8. At this time, the reading controller 17 causes the reading device 2 to start the wireless communication with the electronic tag 93, and the reading device 2 starts outputting a radio wave for the wireless communication. This starts the first time period P1 which will be described later. In other words, the first time period P1 starts when the sensing device 5 senses that at least one of the item 91 or a movable object (here, the customer 90) moving together with the item 91 enters an approach area set on an entering pathway to the prescribed area. As used herein, the "movable object" includes, for example, the container 92 accommodating the item 91, in addition to the customer 90 holding the item 91. Moreover, the "approach area" mentioned herein is an area set on the entering pathway to the prescribed area on the checkout counter 8 and is specifically an area within the distance L1 from the checkout counter 8.

Thereafter, when the customer 90 holding the item 91 further approaches the checkout counter 8 as illustrated in FIG. 4B, the distance from the checkout counter 8 to the customer 90 measured by the first sensor 51 of the sensing device 5 becomes "L2". The distance L2 is shorter than the distance L1 (L2<L1). At this time, the reading controller 17 causes the reading device 2 to end the wireless communication with the electronic tag 93, and the reading device 2 stops outputting the radio wave for the wireless communication. Thus, the first time period P1 ends.

Thereafter, when the customer 90 puts the item 91 in the prescribed area on the reading device 2 as illustrated in FIG. 4C, the second sensor 52 detects that the item 91 or part (e.g., an arm) of the customer 90 passes through an area in front of the prescribed area. Thus, the sensing device 5 determines, based on an output from the second sensor 52, that the item 91 is put in the prescribed area. At this time, the reading controller 17 causes the reading device 2 to start the wireless communication with the electronic tag 93, and the reading device 2 starts outputting the radio wave for the wireless communication. This starts the second time period P2 which will be described later. In other words, the second time period P2 starts when the sensing device 5 senses that at least one of the item 91 or the movable object (here, the customer 90) moving together with the item 91 enters the prescribed area.

As described above, at least one of the first time period P1 or the second time period P2 is a time period determined based on a sensing result by the sensing device 5 configured to sense the location of an item 91. That is, when the sensing device 5 senses an entry of at least one of the movable object (here, the customer 90) or the item 91 into the approach area, the first time period P1 starts, and therefore, the first time period P1 is defined based on the sensing result by the sensing device 5. Moreover, when the sensing device 5 senses the entry of at least one of the movable object (here, the customer 90) or the item 91 into the prescribed area, the second time period P2 starts, and therefore, the second time period P2 is defined based on the sensing result by the sensing device 5. In the present embodiment, the starting point of the first time period P1 is determined based on the sensing result by the first sensor 51 of the sensing device 5, and the starting point of the second time period P2 is determined by the sensing result by the second sensor 52 of the sensing device 5. That is, each of the first time period P1 and the second time period P2 is a time period determined based on a sensing result by the sensing device 5 configured to sense the location of an item 91.

In this case, for the item 91 which is held by the customer 90 and which is the object to be read, the number of times of reading the item information at the reading device 2 changes, for example, as indicated by "I1" in FIGS. 5A and 5B. In FIGS. 5A and 5B, a situation is assumed where the reading device 2 may read pieces of item information on other items displayed, for example, near the checkout counter 8 (hereinafter also referred to as "products around the checkout counter") than the item 91 which is the object to be read. The number of times of reading the pieces of item information on the products around the checkout counter by the reading device 2 is assumed to change, for example, as indicated by "I2" in FIGS. 5 and 5B.

In the example shown in FIG. 5A, the reading device 2 starts wireless communication, and the first time period P1 starts at a time point t1 at which the distance from the checkout counter 8 to the customer 90 becomes "L1" (a state in FIG. 4A). That is, the time point t1 is a starting point of the first time period P1. When the first time period P1 starts, the reading device 2 starts the wireless communication, and thereby, the reading device 2 starts reading pieces of item information on the item 91 which is the object to be read and the products around the checkout counter. Thus, at the time point t1, the numbers I1 and I2 of times of reading the pieces of item information increase as illustrated in FIG. 5A for both the item 91 which is the object to be read and the products around the checkout counter.

Then, the reading device 2 ends the wireless communication, and the first time period P1 ends at a time point t2 at which the distance from the checkout counter 8 to the customer 90 becomes "L2" (a state in FIG. 4B). That is, the time point t2 is an end point of the first time period P1. When the first time period P1 ends, the reading device 2 ends the wireless communication, and thereby, the reading device 2 ends reading the pieces of item information on the item 91 which is the object to be read and the products around the checkout counter. Thus, at the time point t2, the numbers I1 and I2 of times of reading the pieces of item information decreases (to 0) as illustrated in FIG. 5A for both the item 91 which is the object to be read and the products around the checkout counter.

Thereafter, at a time point t3 (state in FIG. 4C) at which the item 91 is put in the prescribed area, the reading device 2 starts the wireless communication, and the second time period P2 starts. That is, the time point t3 is a starting point of the second time period P2. When the second time period P2 starts, the reading device 2 starts the wireless communication, and thereby, the reading device 2 starts reading the pieces of item information on the item 91 which is the object to be read and the products around the checkout counter. Thus, at the time point t3, the numbers I1 and I2 of times of reading the pieces of item information increases as illustrated in FIG. 5A for both the item 91 which is the object to be read and the products around the checkout counter. When the customer 90 puts a plurality of items 91 to be objects to be read in the prescribed area in a plurality of number of separate times, a time point at which the last item 91 to be the object to be read is put in the prescribed area is preferably defined as the time point t3(the starting point of the second time period P2) at which all of the items 91 are put in the prescribed area. For example, when the customer 90 puts the plurality of items 91 in the prescribed area in two separate times, it is preferably determined that all of the plurality of items 91 are put in the prescribed area only after items 91 in the second time are put in the prescribed area, and the reading device 2 is then caused to start reading the pieces of item information.

Then, at a time point t4, that is, after a prescribed time has elapsed from the time point t3, the reading device 2 ends the wireless communication, and the second time period P2 ends. That is, the time point t4 is an end point of the second time period P2. When the second time period P2 ends, the reading device 2 ends the wireless communication, and thereby, the reading device 2 ends reading the pieces of item information on the item 91 which is the object to be read and the products around the checkout counter. Thus, at the time point t4, the numbers I1 and I2 of times of reading the pieces of item information decrease (to 0) as illustrated in FIG. 5A for both the item 91 which is the object to be read and the products around the checkout counter.

The operation described above enables the evaluation value acquirer 11 to calculate evaluation values (the numbers of times of reading item information) for the two time periods, namely, the first time period P1 and the second time period P2 set after the end of the first time period P1. In the present embodiment, the number of times of reading per unit time during the first time period P1 is calculated as the evaluation value in the first time period P1, and the number of times of reading per unit time during the second time period P2 is calculated as the evaluation value in the second time period P2. In the example shown in FIG. 5A, for the item 91 which is the object to be read, the evaluation value in the second time period P2 is larger than the evaluation value in the first time period P1, and the difference value between the evaluation value in the second time period P2 and the evaluation value in the first time period P1 is represented by a change amount ΔI1. In other words, the number I1 of times of reading which is the evaluation value for the item 91 which is the object to be read increases by the change amount ΔI1 during a stop time period P3 between the end time point (time point t2) of the first time period P1 and the starting point (time point t3) of the second time period P2. In contrast, for each product around the checkout counter, the evaluation value in the second time period P2 is substantially equal to the evaluation value in the first time period P1. In other words, the number I2 of times of reading which is the evaluation value for each product around the checkout counter hardly changes during the stop time period P3 between the end time point (time point t2) of the first time period P1 and the starting point (time point t3) of the second time period P2.

The determining processor 12 compares the change amount of the evaluation value from the first time period P1 to the second time period P2 to a threshold. Here, it is assumed that the evaluation value increases from the first time period P1 to the second time period P2, and the change amount ΔI1 for the item 91 which is the object to be read is greater than or equal to the threshold (for example, 10 times). Thus, the determining processor 12 determines that of the determination condition, the first condition relating to the change in the evaluation value over time is satisfied.

Moreover, in the present embodiment, if both the first condition relating to the change in the evaluation value over time and the second condition relating to the received signal strength indication are satisfied, the determining processor 12 determines that the determination condition is satisfied. Thus, the determining processor 12 makes a determination also on a change along with the received signal strength indication.

That is, an action performed by the customer 90 of putting of the item 91 in the prescribed area on the checkout counter 8 causes the received signal strength indication for the item 91 to exponentially rise. Thus, the received signal strength indication increases with a gradient greater than or equal to a prescribed value, and the received signal strength indication during at least the second time period P2 is greater than or equal to the strength threshold (e.g., −55 dBm). Thus, the determining processor 12 determines that of the determination condition, the second condition relating to the received signal strength indication is satisfied.

As a result, the determining processor 12 determines that both the first condition and the second condition are satisfied, that is, the determination condition is satisfied and that the item 91 is the object to be read.

In contrast, the number of times of reading the pieces of item information on the products around the checkout counter by the reading device 2 is assumed to be kept substantially a constant value, for example, as indicated by "I2" in FIG. 5A. Thus, for the products around the checkout counter, the determination condition (first condition) relating to the evaluation value (the number of times of reading) is basically not satisfied. Moreover, for the products around the checkout counter, the determination condition (second condition) relating to the received signal strength indication is also not satisfied. As a result, the determining processor 12 determines that the determination condition is not satisfied for the products around the checkout counter, and that the products around the checkout counter are not the objects to be read.

Moreover, in the example in FIG. 5B, it is assumed that the evaluation value of (the average value of the number I2 of times of reading) the item information on each product around the checkout counter is greater than the evaluation value of (the average value of the number I1 of times of reading) the item 91 which is the object to be read during the second time period P2. That is, for example, when a product around the checkout counter is in close proximity to the reading device 2 or when the electronic tag 93 attached to the product around the checkout counter is in an easily readable state, the evaluation value of the item information on the product around the checkout counter during the determination time period (including the first time period P1 and the second time period P2) increases. Similarly to the example shown in FIG. 5A, also in the example shown in FIG. 5B, for the item 91 which is the object to be read, the evaluation value in the second time period P2 is larger than the evaluation value in the first time period P1, and the difference value between the evaluation value in the second time period P2 and the evaluation value in the first time period P1 is represented by the change amount ΔI1. In other words, the number I1 of times of reading which is the evaluation value for the item 91 which is the object to be read increases by the change amount ΔI1 during a stop time period P3 between the end time point (time point t2) of the first time period P1 and the starting point (time point t3) of the second time period P2. In contrast, for each product around the checkout counter, the evaluation value in the second time period P2 is substantially equal to the evaluation value in the first time period P1. In other words, the number I2 of times of reading which is the evaluation value for each product around the checkout counter hardly changes during the stop time period P3 between the end time point (time point t2) of the first time period P1 and the starting point (time point t3) of the second time period P2.

As a result, also in the example shown in FIG. 5B, the determining processor 12 determines that both the first condition and the second condition are satisfied, that is, the determination condition is satisfied and that the item 91 is the object to be read. In contrast, the determining processor 12 determines that the determination condition is not satisfied for the products around the checkout counter, and that the products around the checkout counter is not the object to be read.

Accordingly, as illustrated in FIG. 6, in the shopping assistance system 1 according to the present embodiment, it is determined that an item 91X put in the prescribed area on the checkout counter 8, that is, on the reading device 2 is the object to be read. In contrast, the shopping assistance system 1 determines that items 91Y simply displayed in the vicinity of the checkout counter 8 are not objects to be purchased as in the case of the product around the checkout counter. Thus, in the shopping assistance system 1, for example, the reading device 2 may read pieces of item information on the items 91Y which are, for example, items 91Y displayed in the vicinity of the checkout counter 8 and which are not objects to be read, but the items 91Y can be distinguished from the item 91X which is the object to be read. In FIG. 6, the item 91 determined as the object to be read (the object to be purchased) by the shopping assistance system 1 is conceptually shown in a balloon.

In contrast, the shopping assistance systems 1X and 1Y according to the comparative examples have the following problems. Here, neither the shopping assistance system 1X nor 1Y according to the comparative examples has a function of determining whether or not the item 91 is the object to be read based on the evaluation value and the received signal strength indication. As illustrated in FIG. 7A, the shopping assistance system 1X according to a first comparative example includes a reading device 2X which includes a housing having a radio wave shielding function and which is of an encapsulation-type. As illustrated in FIG. 7B, the shopping assistance system 1Y according to a second comparative example includes a reading device 2Y which is of an open-type similar to the present embodiment. In FIGS. 7A and 7B, one or more items 91 determined as objects to be read (the object to be purchased) by the shopping assistance systems 1X and 1Y respectively are conceptually shown in a balloon.

In the shopping assistance system 1X according to the first comparative example, the reading device 2X of encapsulation-type communicates with an electronic tag 93 in an internal space of the housing having the radio wave shielding function. Therefore, radio waves are less likely to leak from the internal space of the housing, and an object whose item information is to be read by the reading device 2X can be limited to the item 91X as the object to be read. However, such a reading device 2X of encapsulation-type requires an action of putting the item 91X in the internal space of the housing. In particular, in such a situation where a customer 90 holds baggage by both hands, it is difficult for the customer 90 to open and close a door of the housing. Moreover, for example, when a radio wave from an electronic tag 93 located out of the housing passes through the housing, and when the door is forgotten to be closed, the reading device 2X may read pieces of item information from the electronic tags 93 of the items 91Y located out of the housing. Thus, the items 91Y which are not the objects to be read may be erroneously detected as objects to be read.

In the shopping assistance system 1Y according to the second comparative example, the reading device 2Y of open-type may read not only the item information on the item 91X put in the prescribed area on the checkout counter 8, that is on the reading device 2Y, but also the pieces of item information on the items 91Y displayed in the vicinity of the checkout counter 8. Thus, the items 91Y which are not the objects to be read may be erroneously detected as objects to be read.

The shopping assistance system 1 according to the present embodiment, as described above, can distinguish the items 91Y which are not the objects to be read, such as items 91Y (products around the checkout counter) displayed in the vicinity of the checkout counter 8, from the item 91X as the object to be read. That is, the shopping assistance system 1 provides the advantage that erroneous determination as an object to be read (an object to be purchased) is less likely to occur. In addition, since the shopping assistance system 1 includes the reading device 2 of an open-type, the shopping assistance system 1 does not require operations of opening and closing the door of the housing as in the shopping assistance system 1X of the first comparative example and is thus convenient.

Next, general operation of the shopping assistance system 1 according to the present embodiment will be described with reference to FIG. 8.

The shopping assistance system 1 at first senses, by the sensing device 5, an entry of at least one item 91 or a movable object (here, the customer 90) moving together with the item 91 into the approach area set on the entering pathway to the prescribed area (S1). Since the entry into the approach area is not sensed by the sensing device 5 until the customer 90 approaches the checkout counter 8, the shopping assistance system 1 determines that no entry into the approach area is made (S1: NO) and repeatedly executes the process S1. In contrast, when the customer 90 approaches the checkout counter 8, the sensing device 5 senses the entry into the approach area, and therefore, the shopping assistance system 1 determines that the entry into the approach area is made (S1: Yes) and causes the reading device 2 to start wireless communication with the electronic tag 93. In this way, the first time period P1 is started, and the information acquirer 13 acquires the item information from the reading device 2 (S2). Then, when the customer 90 further approaches the checkout counter 8, the first time period P1 ends. When the first time period P1 ends, the evaluation value acquirer 11 acquires the evaluation value (the number of times of reading item information) in the first time period P1 (S3).

Then, the shopping assistance system 1 senses, by the sensing device 5, whether or not the at least one item 91 or the movable object (here, the customer 90) moving together with the item 91 enters the prescribed area (S4). Since the entry into the approach area is not sensed by the sensing device 5 until the item 91 is put in the prescribed area, the shopping assistance system 1 determines that no entry into the prescribed area is made (S4: NO) and repeatedly executes the process S4. In contrast, when the item 91 is put in the prescribed area, the sensing device 5 senses the entry into the prescribed area, and therefore, the shopping assistance system 1 determines that the entry into the prescribed area is made (S4: Yes) and causes the reading device 2 to start wireless communication with the electronic tag 93. Thus, the second time period P2 is started, and the information acquirer 13 acquires the item information from the reading device 2 (S5). Then, when a prescribed time has elapsed from the start of the second time period P2, the second time period P2 ends. When the second time period P2 ends, the evaluation value acquirer 11 acquires the evaluation value (the number of times of reading item information) in the second time period P2 (S6).

Thereafter, the determining processor 12 executes the determining process (S7). Note that the determining process is not always executed, but when the shielding object-sensing device 18 senses the shielding object, the main computer 10 temporarily interrupts the determining process performed by the determining processor 12. Specifically, the determining processor 12 excludes, from the determination time period (the first time period P1 and the second time period P2) which is a target of the determining process, a prescribed time period from a time point at which the shielding object-sensing device 18 senses a shielding object. For example, when a person (customer 90) as a shielding object passes between the reading device 2 and an item 91 displayed in the vicinity of the checkout counter 8, the number of times of reading the item information on the item 91 temporarily decreases and thereafter rises. To avoid the influence of a change in the evaluation value (the number of times of reading) caused due to the shielding object as described above, the determining process is preferably interrupted for a prescribed time when the shielding object-sensing device 18 senses a shielding object.

In the determining process, the shopping assistance system 1 determines, by the determining processor 12, whether or not the first condition is satisfied for each item 91 by comparing the change amount of the evaluation value from the first time period P1 to the second time period P2 to the threshold. Moreover, in the present embodiment, the determining processor 12 determines whether or not the second condition is satisfied for each item 91 based on the received signal strength indication.

The shopping assistance system 1 determines, based on a result of the determining process, whether or not the at least one item 91 as the object to be read is present (S8). At this time, if it is determined that the determination condition (the first condition and the second condition) is not satisfied, that is, if it is determined that no object to be read is present (S8: No), the shopping assistance system 1 returns to the process 51. In contrast, if it is determined that the determination condition (the first condition and the second condition) is satisfied, that is, it is determined that the object to be read is present (S8: Yes), the selector 14 of the shopping assistance system 1 outputs, to the checkout system 3, the item information on the at least one item 91 as the object to be purchased (S9).

The checkout system 3 which has received the piece of item information executes the checkout process (S10). The shopping assistance system 1 determines whether or not the checkout process by the checkout system 3 is completed (S11). If the checkout process is not completed (S11: No), the process performed by the shopping assistance system 1 returns to process S10. In contrast, when the customer 90 performs checkout and the checkout of the at least one item 91 is thus completed, the checkout system 3 notifies the main computer 10 of the completion of the checkout process. At this time, the shopping assistance system 1 presents to the customer 90 a message saying, for example, "Please take the products. Thank you very much." by display or voice. When the main computer 10 of the shopping assistance system 1 receives the notification of the completion of the checkout process, the shopping assistance system 1 determines that the checkout process is completed (S11: Yes) and changes the value of the checkout completion flag stored in the storage 16 in association with the item information to "1" (S12).

The checkout completion flag is used to determine whether or not the checkout process has been performed on the item information read from the electronic tag 93 by the gate device 61. That is, as illustrated in FIG. 9, when the customer 90 passes through the exit/entrance 101 to go out of the retail store (exits the retail store), the gate device 61 communicates, in a non-contact manner, with the electronic tag 93 attached to the at least one item 91 in the container 92 held by the customer 90. Whether or not the checkout process has been completed is determined for the item information read from the electronic tag 93 by the gate device 61 based on the value of the checkout completion flag stored in association with the item information in the storage 16 of the main computer 10. That is, if the value of the checkout completion flag corresponding to the item information read from the electronic tag 93 by the gate device 61 is "1", it is determined that the checkout process of the at least one item 91 is completed, and therefore, the notification device 62 does not execute the notification process. In contrast, if the value of the checkout completion flag corresponding to the item information read from the electronic tag 93 by the gate device 61 is "0", it is determined that the checkout process of the at least one item 91 is incomplete, and therefore, the notification device 62 executes the notification process.

Here, storage of the value of the checkout completion flag is not limited to the storage 16 of the main computer 10 but may be a database configured on a server device or cloud (cloud computing) connected to the shopping assistance system 1 via, for example, a network. In this case, whether or not the checkout process is completed for the item information read from the electronic tag 93 by the gate device 61 is determined by inquiring the database via, for example, a network by the shopping assistance system 1.

Moreover, when the checkout process is not completed for the item information read from the electronic tag 93 by the gate device 61, the shopping assistance system 1 may interlock the gate device 61 with an automatic door at the exit/entrance 101 so that the automatic door at the exit/entrance 101 is not opened.

As described above, when the customer 90 simply puts the at least one item 91 as the object to be purchased on the checkout counter 8, the shopping assistance system 1 can identify the at least one item 91 as the object to be read (the object to be purchased). Thus, the shopping assistance system 1 enables shopping to be efficiency performed.

(3.2) Calculation Method of Evaluation Value

The computation method of the evaluation value is not limited to the method of calculating the average value (the number of times of reading per unit time) for each of the first time period P1 or the second time period P2 as described above but may be accordingly modified.

Figure 10:
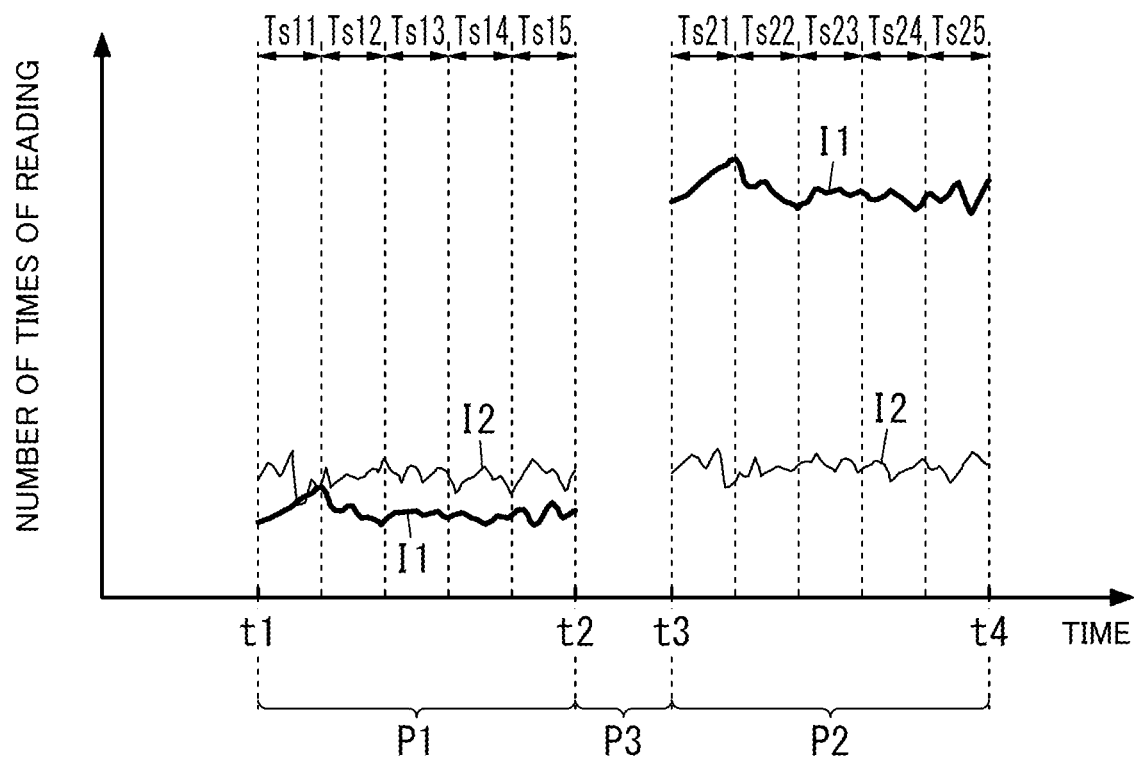
FIG. 10 is a wave form diagram illustrating an example of a change in the number of times of reading over time in the shopping assistance system.

For example, as illustrated in FIG. 10, the evaluation value acquirer 11 may set a plurality of time slots Ts11 to Ts15 in the first time period P1 and a plurality of time slots Ts21 to Ts25 in the second time period P2 and calculate the evaluation value of each of the first time period P1 or the second time period P2. In the example shown in FIG. 10, the first time period P1 includes the plurality of time slots Ts11 to Ts15, and the second time period P2 includes the plurality of time slots Ts21 to Ts25. The determining processor 12 uses a representative value of evaluation values in the plurality of time slots Ts11 to Ts15 and a representative value of evaluation values in the plurality of time slots Ts21 to Ts25 respectively as the evaluation value in the first time period P1 and the evaluation value in the second time period P2. As used herein, the "representative value" includes a maximum value, an average value, a median value, a most frequent value, and a minimum value, and in the present embodiment, the representative value is, for example, the maximum value.

Specifically, in FIG. 10, the first time period P1 includes the five time slots Ts11 to Ts15, and the second time period P2 includes the five time slots Ts21 to Ts25. First, for the first time period P1, the evaluation value acquirer 11 adds up the number of times of reading in each of the five time slots Ts11 to Ts15 for each piece of item information and stores the sum of the number of times of reading in the storage 16. The evaluation value acquirer 11 calculates the maximum value (the representative value) of the number of times of reading in those five time slots Ts11 to Ts15, that is, the number of times of reading in the time slots Ts11 to Ts15 in which the number of times of reading is maximum as the evaluation value in the first time period P1. In the same manner, for the second time period P2, the evaluation value acquirer 11 adds up the number of times of reading in each of the five time slots Ts21 to Ts25 for each piece of item information and stores the sum of the number of times of reading in the storage 16. The evaluation value acquirer 11 calculates the maximum value (the representative value) of the number of times of reading in those five time slots Ts21 to Ts25, that is, the number of times of reading in the time slot Ts21 to Ts25 in which the number of times of reading is maximum as the evaluation value in the second time period P2. The determining processor 12 uses the evaluation values of the first time period P1 and the second time period P2 calculated in this way to determine whether or not the item 91 is the object to be read.

In the example shown in FIG. 10, the width of each of the plurality of time slots Ts11 to Ts15 and the plurality of time slots Ts21 to Ts25 is a prescribed time (e.g., 500 milliseconds). However, the widths of the plurality of time slot Ts11 to Ts15 and Ts21 to Ts25 do not have to be equal to each other.

Moreover, in the example shown in FIG. 10, the time slots Ts11 to Ts15 in the first time period P1 are set so as not to overlap each other, and the time slots Ts21 to Ts25 in the second time period P2 are set so as not to overlap each other. However, this example should not be construed as limiting, and the time slots Ts11 to Ts15 in the first time period P1 may be set so as to overlap each other, and the time slots Ts21 to Ts25 in the second time period P2 may be set so as to overlap each other.

Moreover, the determining processor 12 may compare each of the plurality of time slots Ts11 to Ts15 included in the first time period P1 to a corresponding one of the plurality of time slots Ts21 to Ts25 included in the second time period P2. For example, in the example shown in FIG. 10, the determining processor 12 compares the evaluation values of the time slot Ts11 and the time slot Ts21 to each other and the evaluation values of the time slot Ts12 and the time slot Ts22 to each other. As described above, the evaluation values are compared with each other between the time slots, and then, if, for example, in all of the time slots, the evaluation values increase more in the first time period P1 than in the second time period P2, the determining processor 12 determines that the first condition is satisfied.

(3.3) Change of Determination Condition

The determination condition based on which the determining processor 12 makes a determination may be changed, as necessary. Three configuration examples for a change of the determination condition will be described below.

As a first configuration example, the determination condition of the determining processor 12 is changed in accordance with the number of items 91 whose pieces of item information are read by the reading device 2 in a prescribed time period. Here, the number of items 91 whose pieces of item information are read by the reading device 2 in a prescribed time period is counted by the reading device 2 or the determining processor 12. "A prescribed time period" in which the number of items is to be counted is, for example, the first time period P1 or the second time period P2. The "threshold" which is compared to the change amount of the evaluation value, for example, from the first time period P1 to the second time period P2 changes in accordance with the number of items 91. Specifically, the threshold is preferably reduced as the number of items 91 increases.

As the second configuration example, the determination condition of the determining processor 12 is changed in accordance with the number of items 91 which are items 91 whose pieces of item information are read by the reading device 2 in a prescribed time period and in which at least one of the evaluation value or the received signal strength indication at a time period of wireless communication by the reading device 2 is greater than or equal to a reference value.

Here, the number of items 91 in which at least one of the evaluation value (the number of times of reading) or the received signal strength indication at the time period of the wireless communication by the reading device 2 is greater than or equal to the reference value is counted by the reading device 2 or the determining processor 12. That is, in the first configuration example, the number of all of the items 91 whose pieces of item information are read in a prescribed time period is counted, whereas in the second configuration example, the number of only items 91 in which at least one of the evaluation value or the received signal strength indication is greater than or equal to the reference value is counted. Thus, in the second configuration example, items 91 whose pieces of item information are read by the reading device 2 in a prescribed time period but which are located away from, for example, the reading device 2 and whose values of the received signal strength indication are smaller than the reference value are excluded from the number of items based on which the determination condition is to be determined. The "threshold" which is compared to the change amount of the evaluation value, for example, from the first time period P1 to the second time period P2 changes in accordance with the number of items 91. Specifically, the threshold is preferably reduced as the number of items 91 increases.

As the third configuration example, the determination condition of the determining processor 12 is changed in accordance with the number of items 91 present in the prescribed area. Here, the number of the items 91 present in the prescribed area is counted based on an output of, for example, an image-capturing device 45 configured to capture an image of a surface (upper surface) of the reading device 2 which is to be, for example, the prescribed area or a weight sensor included in the reading device 2. That is, in the first and second configuration examples, the number of items 91 whose pieces of item information are read in a prescribed time period is counted, whereas in the third configuration example, the number of items 91 which are actually put in the prescribed area is counted. The "threshold" which is compared to the change amount of the evaluation value, for example, from the first time period P1 to the second time period P2 changes in accordance with the number of items 91. Specifically, the threshold is preferably reduced as the number of items 91 increases.

That is, as the number of items 91 whose pieces of item information are read by the reading device 2 increases, the reading probability of each piece of item information decreases due to collision of signals or the like, and therefore, the number of times of reading item information per unit time per item 91 decreases. Thus, changing the determination condition in accordance with the number of items 91 to reduce the determination reference (i.e., to reduce the threshold) improves the determination accuracy of the object to be read. For example, threshold Th is represented by mathematical formula "$Th = A \cdot \alpha / n$", where "A" is the number of pieces of item information readable by the reading device 2 per unit time, "$\alpha$" is the reduction rate in the number of detections due to the collision, and "n" is the number of items 91. Based on the mathematical formula, the determination reference (i.e., the threshold) may be automatically determined in accordance with the number of items 91, or the determination reference (i.e., the threshold) may be automatically determined based on a table which defines the correspondence relationship between the number of items 91 and the threshold. Moreover, for the number of items 91, the determination reference (i.e., the threshold) may change not by a unit of one item but by a unit of a plurality of items. In this case, the threshold stepwise changes, for example, such that when the number of items 91 is smaller than 20, the threshold is "20", whereas when the number of items 91 is larger than or equal to 20 and smaller than 50, the threshold is "15".

(4) Variation

The first embodiment is one of the various embodiments of the present disclosure. Various modifications may be made to the first embodiment depending on design and the like as long as the object of the present disclosure is achieved. Moreover, functions similar to those of the reading system 100 may be implemented by a reading method, a (computer) program, a non-transitory storage medium storing a program, or the like. Moreover, functions similar to those of the shopping assistance system 1 may be realized by a shopping assistance method, a (computer) program, a non-transitory storage medium storing a program, or the like. A reading method according to an aspect includes, with regard to a reading device 2 is configured to perform wireless communication with an electronic tag 93 attached to each of one or more items 91 by using a radio wave as a medium to read item information on each of the one or more items 91, acquiring an evaluation value about at least one of: a total number of times; a time interval; or a frequency, of reading the item information on each of the one or more items 91. The reading method includes determining, for each of the one or more items 91, whether or not each of the one or more items 91 is an object to be read based on a change in the evaluation value over time. A program according to an aspect is a program configured to cause a computer system to execute a process (see "S3" and "S6" in FIG. 8) of acquiring, with regard to a reading device 2 is configured to perform wireless communication with an electronic tag 93 attached to each of one or more items 91 by using a radio wave as a medium to read item information on each of the one or more items 91, an evaluation value about at least one of: a total number of times; a time interval; or a frequency, of reading item information for each of at the one or more items 91. The program is a program configured to cause the computer system to further execute a process (see "S7" in FIG. 8) of determining, for each of the one or more items 91, whether or not each of the one or more items 91 is the object to be read based on a change in the evaluation value over time.

Variations of the first embodiment will be described below. The variations described below are applicable accordingly in combination.

The reading system 100 and the shopping assistance system 1 in the present disclosure include a computer system, for example, in the main computer 10. The computer system includes, as principal hardware components, a processor and a memory. The processor executes a program stored in the memory of the computer system, thereby implementing the functions as the reading system 100 and the shopping assistance system 1 of the present disclosure. The program may be stored in the memory of the computer system in advance, may be provided via a telecommunications network, or may be provided as a non-transitory recording medium such as a computer system-readable memory card, optical disc, or hard disk drive storing the program. The processor of the computer system may be made up of a single or a plurality of electronic circuits including a semiconductor integrated circuit (IC) or a large-scale integrated circuit (LSI). The integrated circuit such as IC or LSI mentioned herein may be referred to in another way, depending on the degree of the integration and includes integrated circuits called system LSI, very-large-scale integration (VLSI), or ultra-large-scale integration (VLSI). A field-programmable gate array (FPGA), which is programmable after fabrication of the LSI, or a logical device which allows reconfiguration of connections in LSI or reconfiguration of circuit cells in LSI may be adopted as the processor. The plurality of electronic circuits may be collected on one chip or may be distributed on a plurality of chips. The plurality of chips may be collected in one device or may be distributed in a plurality of devices. As mentioned herein, the computer system includes a microcontroller including one or more processors and one or more memories. Thus, the microcontroller is also composed of one or more electronic circuits including a semiconductor integrated circuit or a large-scale integrated circuit.

Collecting the plurality of functions in the reading system 100 or the shopping assistance system 1 in one housing is not an essential configuration of the reading system 100 or the shopping assistance system 1. The components of the reading system 100 or the shopping assistance system 1 may be distributed in a plurality of housings. Moreover, at least some functions of the reading system 100 or the shopping assistance system 1 may be implemented by, for example, a server device, cloud (cloud computing), and the like. In contrast, in the first embodiment, at least some functions of the reading system 100 or the shopping assistance system 1 distributed in a plurality of devices may be collected in one housing.

Moreover, the application of the reading system 100 and the shopping assistance system 1 is not limited to application in convenience stores, but the shopping assistance system 1 may be installed in retail stores other than convenience stores.

Moreover, the application of the reading system 100 is not limited to application in the retail store, but the reading system 100 may be installed in a facility such as a factory, a warehouse, an office, a delivery center, or a customs house other than the retail store. In this case, for example, the reading system 100 may be used for inventory management, inspection, and the like of items 91 which are not products. Thus, it is not essential for the reading system 100 that the reading system 100, together with the checkout system 3, forms the shopping assistance system 1.

Moreover, the end time point of the first time period P1 is not limited to a definition based on the distance measured by the first sensor 51, but, for example, in this case, the time length of the first time period P1 is a certain length (a prescribed time). Moreover, the end time point of the second time period P2 is not limited to a time point at which a prescribed time has elapsed from the starting time point of the second time period P2, but the end time point may be defined based on, for example, a sensing result by the second sensor 52 or a process status of the checkout system 3.

Moreover, the "evaluation value" which the evaluation value acquirer 11 acquires is not limited to the number of times of reading, but the "evaluation value" may be, as described above, a value relating to at least one of the number of times, a time interval, or a frequency of reading pieces of item information by the reading device 2 in a prescribed time period. For example, the "evaluation value" may be a reading time interval, a reading frequency, or a combination thereof (the number of times, the time interval, and the frequency) instead of the number of times of reading. When the evaluation value is the reading time interval, the evaluation value increases as the time interval decreases, and the evaluation value decreases as the time interval increases. When the evaluation value is the reading frequency, the evaluation value increases as the frequency increases, and the evaluation value decreases as the frequency decreases.

Moreover, the evaluation value may be calculated by the reading device 2. That is, the reading device 2 may calculate an evaluation value relating to at least one of the number of times, the time interval, and the frequency of reading item information each time the reading device 2 reads the item information. In this case, the evaluation value acquirer 11 at least directly acquires, from the reading device 2, an evaluation value instead of a value calculated based on the acquisition condition of the item information from the reading device 2 in the information acquirer 13.

Moreover, in the first embodiment, the determining processor 12 determines whether or not the item 91 is the object to be read based on a combination of the change in the evaluation value over time and the received signal strength indication, but using the received signal strength indication for determination is not an essential configuration for the reading system 100. That is, the determining processor 12 may determine whether or not the item 91 is the object to be read based on the change in the evaluation value over time but without depending on the received signal strength indication.

Moreover, the determining processor 12 may use, for example, Doppler shift or a phase signal to determination the object to be read other than the change in the evaluation value over time, alternatively to the received signal strength indication, or additionally to the received signal strength indication. That is, since the reading device 2 wirelessly communicates with the electronic tag 93 by using a radio wave as a medium, the frequency or the phase of the radio wave received by the reading device 2 varies depending on the relative movable speed of the electronic tag 93 with respect to the reading device 2. Thus, whether or not the item 91 to which the electronic tag 93 is attached is moving relative to the reading device 2 is determined based on Doppler shift, a phase signal, or the like, and as a third condition, that the item 91 is moving relative to the reading device 2 may be included in the determination condition. In this case, an item, such as a product around the checkout counter, which is not moving relative to the reading device 2, that is, an item which is stationary, can be excluded from the objects to be read.

Moreover, the first sensor 51 of the sensing device 5 is not limited to a non-contact range sensor. Examples of the non-contact range sensor include an ultrasonic range sensor, an optical range sensor, and a radio range sensor. Alternatively, the first sensor 51 may be a piezoelectric sensor, an acceleration sensor, or the like installed on a floor around the checkout counter 8. Even with such a sensor, the location of a customer 90 around the checkout counter 8 can be sensed when the weight of a customer 90 is applied to the floor. Similarly, the second sensor 52 of the sensing device 5 is not limited to the non-contact range sensor such as a light curtain or area sensor, but may be, for example, a weight sensor or an acceleration sensor installed in the prescribed area. Even with such a sensor, it is possible to sense that an item 91 is put in the prescribed area when the weight of the item 91 is applied to the prescribed area. In addition, the image-capturing device 45 of the cash register system 4 may be used also as the sensing device 5 (the first sensor 51 or the second sensor 52).

Moreover, that the sensing device 5 includes two sensors, namely, the first sensor 51 and the second sensor 52 is not an essential configuration for the reading system 100, and, for example, the sensing device 5 may include only one sensor. The sensing device 5 may sense, for example, by one sensor, both that the item 91 enters an area at a prescribed distance from the checkout counter 8 and that the item 91 is put in the prescribed area.

Moreover, the "prescribed range" based on which the determining processor 12 determines whether or not the item 91 is the object to be read is not limited to one threshold but may be defined by a plurality of thresholds including a first threshold and a second threshold. In this case, for example, a range greater than or equal to the first threshold and less than the second threshold is the "prescribed range" and a range less than the first threshold and a range greater than or equal to the second threshold are out of the "prescribed range".

Moreover, the determining processor 12 may determine whether or not the item 91 is the object to be read based on not only a change in the evaluation value in the case of focusing on one item 91 but also a correlation with changes in the evaluation values of other items 91. That is, for example, when only one item 91 of ten items 91 is the object to be read, the change amount of the evaluation value for the one item 91 which is the object to be read is significantly greater than that of each of the other nine items 91. Thus, the determining processor 12 may determine whether or not the item 91 is the object to be read in consideration of such a correlation between a plurality of items 91.

Moreover, the second condition relating to the received signal strength indication of the determination condition is not limited to that the received signal strength indication during at least the second time period P2 is greater than or equal to the strength threshold, but the second condition may accordingly be set. For example, the second condition may include that the received signal strength indication increases from the first time period P1 to the second time period P2, and the change amount of the received signal strength indication from the first time period P1 to the second time period P2 is greater than or equal to the strength threshold (e.g., 5 dB).

Moreover, the "evaluation value" acquired by the evaluation value acquirer 11 is not limited to the number of times of reading item information by the reading device 2 but may be, for example, a time interval or a frequency of reading item information by the reading device 2, or a combination thereof (the number of times, the time interval, and the frequency).

Furthermore, the electronic tag 93 is not limited to the passive-type RF tag but may be an active-type RF tag. The reading device 2 may combine a means such as image recognition or the like with information read from the electronic tag 93 to read item information.

Moreover, the shopping assistance system 1 may be used not only in a situation where at least one item 91 can be purchased without requiring an operation by a clerk as illustrated in the case of the first embodiment but also in a situation where a clerk is at a checkout counter as in the case of a so-called manned checkout counter, for example.

Moreover, the container 92 in which the at least one item 91 is to be stored is not limited to a bag but may be, for example, a pouch (plastic shopping bag), a basket, a box, or a cart. Bagging of storing the at least one item 91 in the container 92 does not have to be performed by a sales clerk or a customer 90. For example, the at least one item 91 may be displayed in a retail store in a state where the at least one item 91 is stored in the container 92, or the bagging may be automatically performed by using a bagging device or the like. Moreover, the configuration of the reading device 2 is not limited to a configuration in which the reading device 2 reads item information from the electronic tag 93 attached to the at least one item 91 in a state where the at least one item 91 is accommodated in the container 92. The reading device 2 may be configured to read item information from an electronic tag 93 of an at least one item 91 which is not accommodated in the container 92. In this case, after the reading device 2 reads the item information, the at least one item 91 may be stored in the container 92 or does not have to be stored in the container 92.

The configuration in which the main computer 10 is configured to communicate with the checkout system 3 is not an essential configuration of the shopping assistance system 1. The main computer 10 does not have to be configured to communicate with the checkout system 3. For example, the main computer 10 itself may have a function of performing the checkout process of an item 91 based on item information.

Moreover, the checkout process does not have to be performed in a retail store. For example, only identification of a customer 90 who purchases at least one item 91 is performed in the retail store, and later, the checkout process using, for example, a credit card or the like may be executed. The identification of the customer 90 is achieved by, for example, communication with a personal digital assistant terminal (for example, smartphone) carried by the customer 90, or biometrics authentication (including face authentication), or the like.

Moreover, the configuration of the display device 42 is not limited to a configuration in which an image is projected onto an object by a projection mapping technique, but the display device 42 may be, for example, a touch panel display. Furthermore, as the input device 43, for example, an input device 43 including a mechanical switch may be adopted into at least part of an input means of the customer 90 to the shopping assistance system 1.

Moreover, the shopping assistance system 1 may further include a writing device configured to write writing information to the electronic tag 93 attached to the at least one item 91. Specifically, a reading device 2 including a reader writer configured to read and write data (information) from and to the electronic tag 93 may be used also as the writing device. For example, the writing device writes, to an electronic tag 93, checkout completion information representing that the checkout process is completed for an item 91 to which the electronic tag 93 is attached. In this case, the gate device 61 determines whether or not the checkout completion information is written to the electronic tag 93, and if the checkout completion information is not written to the electronic tag 93, it is possible to perform notification by the notification device 62. That is, when the writing device implements a function of a so-called "kill tag", it is possible to confirm that the checkout process is normally completed for an item 91 which is about to be brought out of the retail store without executing a process of changing the value of the checkout completion flag to "1" by the main computer 10.

Moreover, the sensing device 5 is not an essential component of the shopping assistance system 1. The main computer 10 may start the determining process by the determining processor 12, for example, with reception of a specific operation given to the input device 43 by a customer 90 as a trigger. That is, a start timing of the determining process does not necessarily have to be automatically determined by an objective sensor or the like but may be determined by an operation given by a customer 90.

Moreover, the reading device 2 is not limited to be an open type but may include a shield or the like for reducing leakage of a radio wave from the prescribed area. In this case, the entire periphery of the prescribed area does not have to be completely closed by the shield. For example, the prescribed area may be open in front and upward directions. Moreover, the shield has at least a radio wave shielding function and may thus have, for example, a mesh shape (or a shape having through holes). The antenna 21 is not limited to an antenna for a circularly polarized wave but may be, for example, an antenna for an ellipse polarized wave, a linearly polarized wave, or the like.

Second Embodiment

Figure 11:
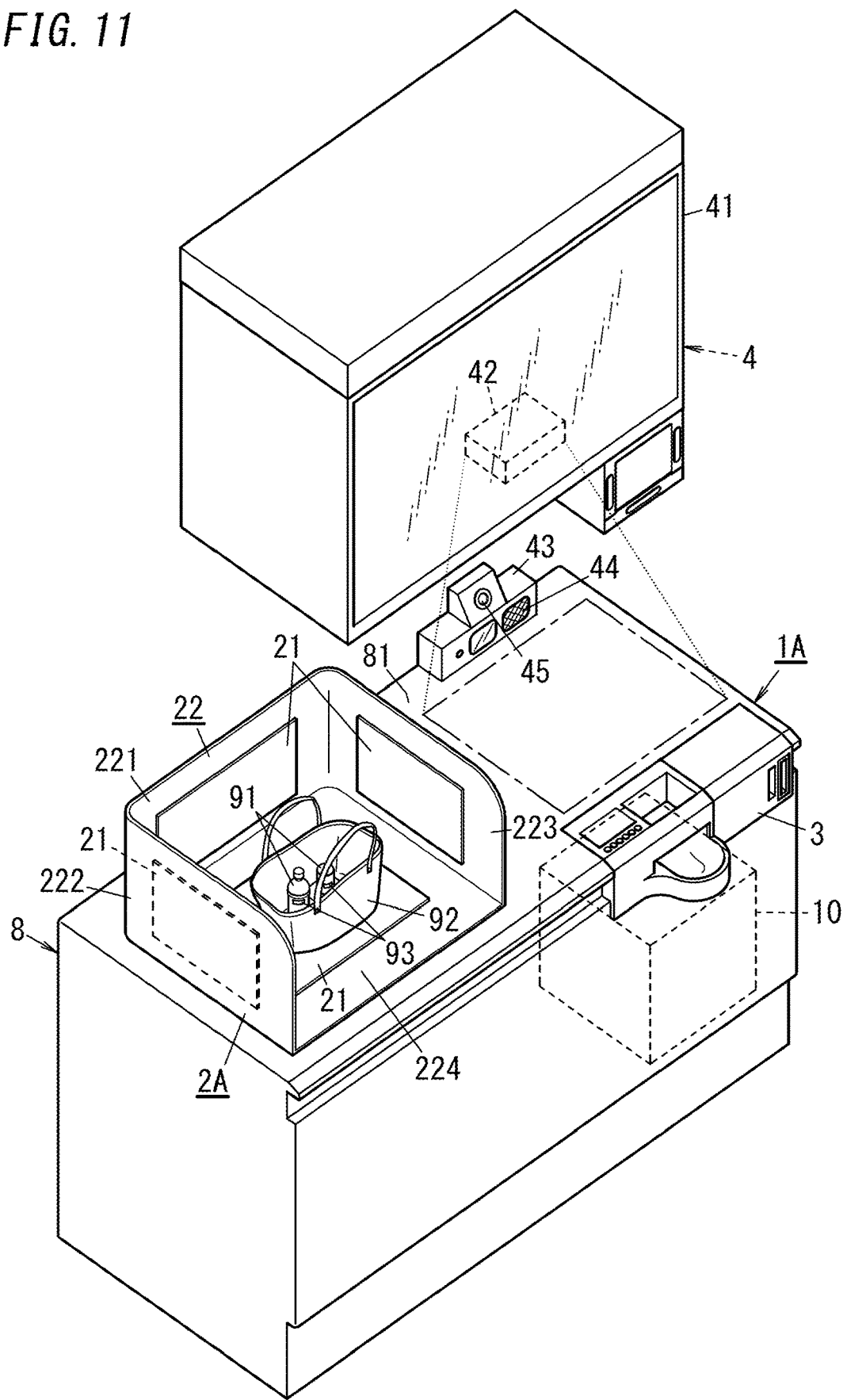
FIG. 11 is an exterior perspective view illustrating a checkout counter to which a shopping assistance system according to a second embodiment is applied.

As illustrated in FIG. 11, a shopping assistance system 1A according to the present embodiment is different from the shopping assistance system 1 of the first embodiment in that a reading device 2A is configured to perform wireless communication with an electronic tag 93 via a plurality of antennas 21 which are different from each other in at least one of location or orientation. Components similar to those in the first embodiment are hereinafter denoted by the same reference signs as those in the first embodiment, and the description thereof is accordingly omitted.

The reading device 2A includes, for example, as shown in FIG. 11, a housing 22 installed on an upper surface 81 of a checkout counter 8. Note that inclusion of the housing 22 in components of the reading device 2A is not essential for the shopping assistance system 1. The housing 22 does not have to be included in the components of the reading device 2A.

The housing 22 has a radio wave shielding function and is provided to surround a prescribed area. In other words, the prescribed area is defined by the housing 22, and a range (space) surrounded by the housing 22 functions as the prescribed area. Thus, the housing 22 functions as a shield for reducing leakage of a radio wave from the prescribed area.

In the present embodiment, the housing 22 has a shape of a box with its upper surface and front surface being open. That is, the housing 22 includes a back wall 221, a left side wall 222, a right side wall 223, and a bottom panel 224. The prescribed area is a space surrounded by the back wall 221, the left side wall 222, the right side wall 223, and the bottom panel 224.

The plurality of antennas 21 are provided at the back wall 221, the left side wall 222, the right side wall 223, and the bottom panel 224. In the present embodiment, the plurality of antennas 21 are four patch antennas (microstrip antennas) provided on inner side surfaces (i.e., surfaces facing the prescribed area) of the back wall 221, the left side wall 222, the right side wall 223, and the bottom panel 224. Thus, the antenna 21 provided on the back wall 221 has directionality in the forward and rearward directions, the pair of antennas 21 provided on the left side wall 222 and the right side wall 223 have directionality in the left and right directions, and the antenna 21 provided on the bottom panel 224 has directionality in the upward and downward directions. Each antenna 21 has a surface which may be covered with a spacer film which is electrically insulating. Thus, it is possible to reduce contact between the electronic tag 93 and the antennas 21 provided on the inner side surfaces of the back wall 221 and the like, and it is possible to improve a reading ratio of item information from the electronic tag 93.

In other words, of the plurality of antennas 21, at least two antennas 21 are oriented in directions different from each other. In the present embodiment, the plurality of antennas 21 include three or more antennas 21 having directionalities along three axes orthogonal to one another. Via the plurality of antennas 21, the reading device 2A transmits and receives a radio wave as a communication medium to and from an electronic tag 93 located in the prescribed area surrounded by the housing 22 so as to perform wireless communication. That is, the plurality of antennas 21 are arranged to surround at least one item 91.

Note that the configuration of the reading device 2A is not limited to a configuration including four antennas 21, but the reading device 2A may include two, three, or more than or equal to five antennas 21. For example, the housing 22 may have a shape formed by omitting the back wall 221 and displacing the left side wall 222 and the right side wall 223 to be obliquely oriented to form a V-shape in plan view so as to bring rear edges of the left side wall 222 and the right side wall 223 are in contact with each other. In this case, the two antennas 21 provided on the left side wall 222 and the right side wall 223 are respectively located at rear left and rear right locations of the prescribed area. Alternatively, as another example, the housing 22 may have a shape formed by omitting the left side wall 222 and the right side wall 223 and curving the back wall 221 such that a central part of the back wall 221 rearwardly protrudes. In this case, the antennas 21 provided on the back wall 221 have a curved surface. Alternatively, as still another example, from the housing 22, the left side wall 222 and the right side wall 223 may be omitted, and the housing 22 may have a top board at a location facing the bottom panel 224, and the antenna 21 is provided on an inner side surface (i.e., a surface facing the prescribed area) of the top board. In this case, the three antennas 21 provided on the back wall 221, the bottom panel 224, and the top board are located behind, under, and over the prescribed area.

In the present embodiment, the evaluation value acquirer 11 acquires, evaluation values (the number of times of reading) for each antenna 21. That is, in the present embodiment, the reading device 2A has a plurality of antennas 21, and therefore, the evaluation value acquirer 11 individually acquires the evaluation value (the number of times of reading) for each of the plurality of antennas 21. The evaluation value acquirer 11 stores the evaluation values (the number of times of reading) acquired from the reading device 2A in a memory of the main computer 10 for each antenna 21.

A determining processor 12 is configured to perform determination based on evaluation values (the numbers of times of reading) for the plurality of antennas 21. That is, in the present embodiment, the evaluation value acquirer 11 individually acquires evaluation values for the plurality of plurality of antennas 21, and therefore, the determining processor 12 determines whether or not individual items 91 are the objects to be read based on combinations of the evaluation values for the plurality of antennas 21.

Here, various types of algorithms are included in examples of a determination algorithm of the determining processor 12 when the determining process is performed based on the combination of the evaluation values for the plurality of antennas 21. For example, the determining processor 12 determines that the determination conditions are satisfied when for each of at least two antennas 21, a change of the evaluation value over time satisfies the determination condition (the first condition). For another example, the determining processor 12 determines that the determination conditions are satisfied when for each of antennas 21, a change of the evaluation value over time satisfies the determination condition (the first condition). For still another example, the determining processor 12 may execute the determining process with the plurality of antennas 21 being discriminated between internally oriented antennas 21 for receiving a radio wave from an interior of the prescribed area and externally oriented antennas 21 for receiving a radio wave from an exterior of the prescribed area. That is, for example, a change in evaluation value over time of only the inwardly oriented antenna 21 satisfies the determination condition (first condition), the determining processor 12 determines that the determination condition is satisfied.

With the above-described configuration, the shopping assistance system 1A determines whether or not the at least one item 91 is the object to be read based on the evaluation values for the plurality of antennas 21, which improves the determination accuracy of whether or not the at least one item 91 is the object to be read.

Figure 12:
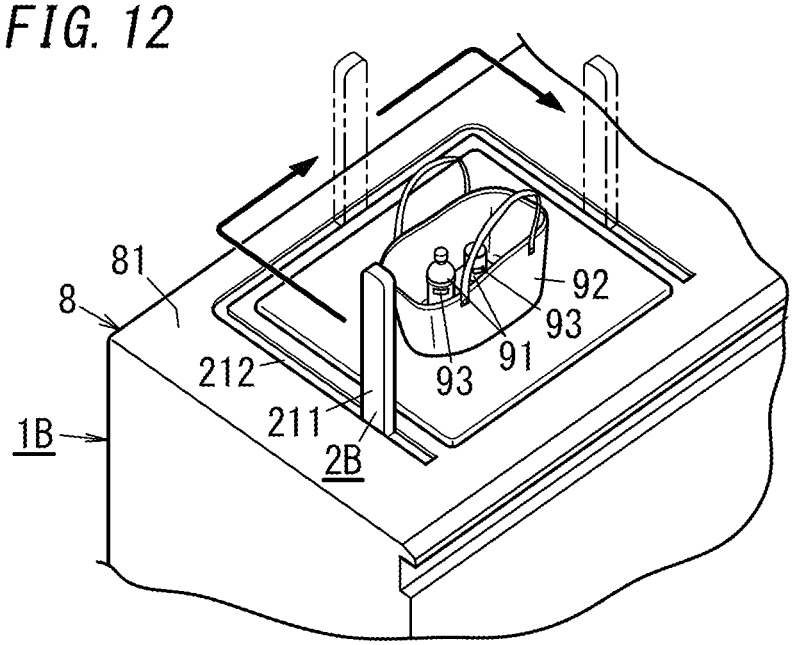
FIG. 12 is an exterior perspective view illustrating a main part of a checkout counter to which a shopping assistance system according to a variation of the second embodiment is applied.

As a shopping assistance system 1B according to a variation of the second embodiment, a reading device 2B may include, as illustrated in FIG. 12, one antenna member 211 and a displacement mechanism 212 configured to displace the antenna member 211. In this case, displacing the antenna member 211 by the displacement mechanism 212 enables the antenna member 211 to be used as at least two antennas 21 of a plurality of antennas 21. In the example shown in FIG. 12, the displacement mechanism 212 displaces the antenna member 211 having a bar shape along a substantially C-shaped rail surrounding a prescribed area. Thus, the location and orientation of the antenna member 211 change over time. The reading device 2B uses the antenna member 211 at different time points to resemble a plurality of antennas 21 and perform wireless communication with an electronic tag 93 via the plurality of antennas 21. Furthermore, a communication area of the plurality of antennas 21 may be displaced by beamforming.

As another variation of the second embodiment, it is not necessary that all of a plurality of antennas 21 are provided to a checkout counter 8, and one or some of the plurality of antennas 21 may be installed in a distributed manner, for example, on a ceiling of a retail store. In this case, a determining processor 12 can estimate a moving route of a customer 90 holding at least one item 91 based on, for example, a change of evaluation values over time for the plurality of antennas 21. Therefore, when the customer 90 holding the at least one item 91 approaches the checkout counter 8 from the front, the determining processor 12 preferably determines that the determination condition is satisfied.

The various configurations (including the variations) described in the second embodiment are adoptable accordingly in combination with the various configurations (including the variations) described in the first embodiment.

Third Embodiment

Figure 13:
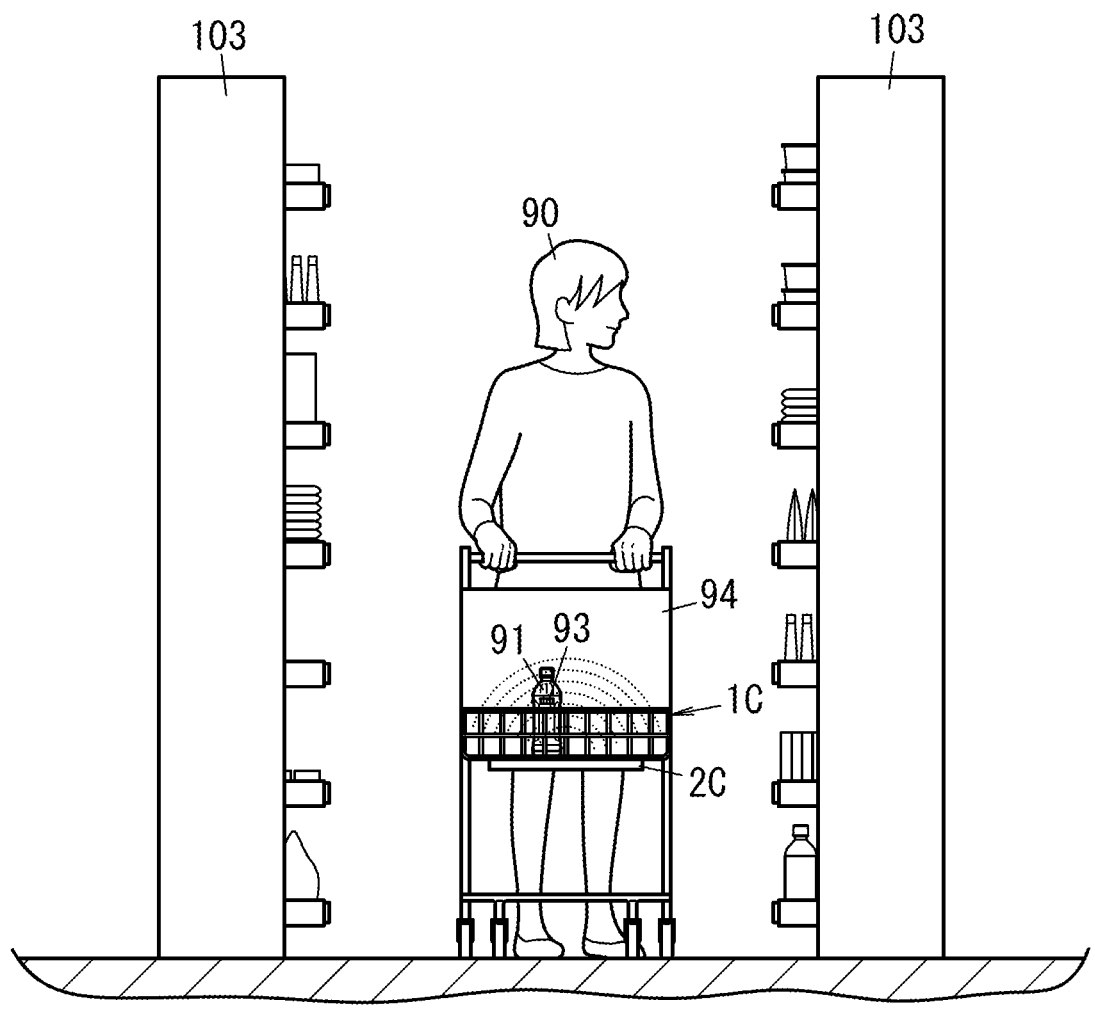
FIG. 13 is a view schematically illustrating a shopping assistance system according to a third embodiment.

As illustrated in FIG. 13, a shopping assistance system 1C according to the present embodiment is different from the shopping assistance system 1 of the first embodiment in that a reading device 2C is not fixed to a fixed location but is provided to a cart 94. Components similar to those in the first embodiment are hereinafter denoted by the same reference signs as those in the first embodiment, and the description thereof is accordingly omitted.

That is, in the present embodiment, the reading device 2C is not fixed to a fixed location but is provided to the cart 94 (shopping cart) which is movable in a retail store. In the example shown in FIG. 13, the reading device 2C is attached to a lower surface of a carrier of the cart 94 and performs wireless communication with an electronic tag 93 in a prescribed area defined on the carrier of the cart 94. That is, in a state where at least one item 91 is on the carrier of the cart 94, the reading device 2C performs wireless communication with an electronic tag 93 attached to the at least one item 91 to read its item information. In the present embodiment, the reading device 2 is configured to perform two-way communication with a main computer 10 provided to a checkout counter 8 based on wireless communication by using a radio wave as a medium.

In the shopping assistance system 1C, a customer 90 moves in the retail store while the customer pushes the cart 94, and the customer 90 picks up, from a rack 103 or the like, at least one item 91 to be purchased and puts the at least one item 91 on the carrier of the cart 94. Thus, in the reading device 2C provided to the cart 94, an evaluation value such as the number of times of reading item information on the at least one item 91 put on the carrier shows a specific changing pattern. Accordingly, a determining processor 12 determines that the evaluation value (the number of times of reading) regarding the at least one item 91 put by the customer 90 on the carrier of the cart 94 satisfies the determination conditions and determines that the at least one item 91 is the object to be read.

With the above-described configuration, the customer 90 does not have to put the at least one item 91 on the checkout counter 8, and it is also possible, for example, to complete purchase of the at least one item 91 without the customer 90 passing through the checkout counter 8.

The various configurations (including variations) described in the third embodiment are adoptable accordingly in combination with the various configurations (including the variations) described in the first embodiment or the second embodiment.

Fourth Embodiment

Figure 14A:
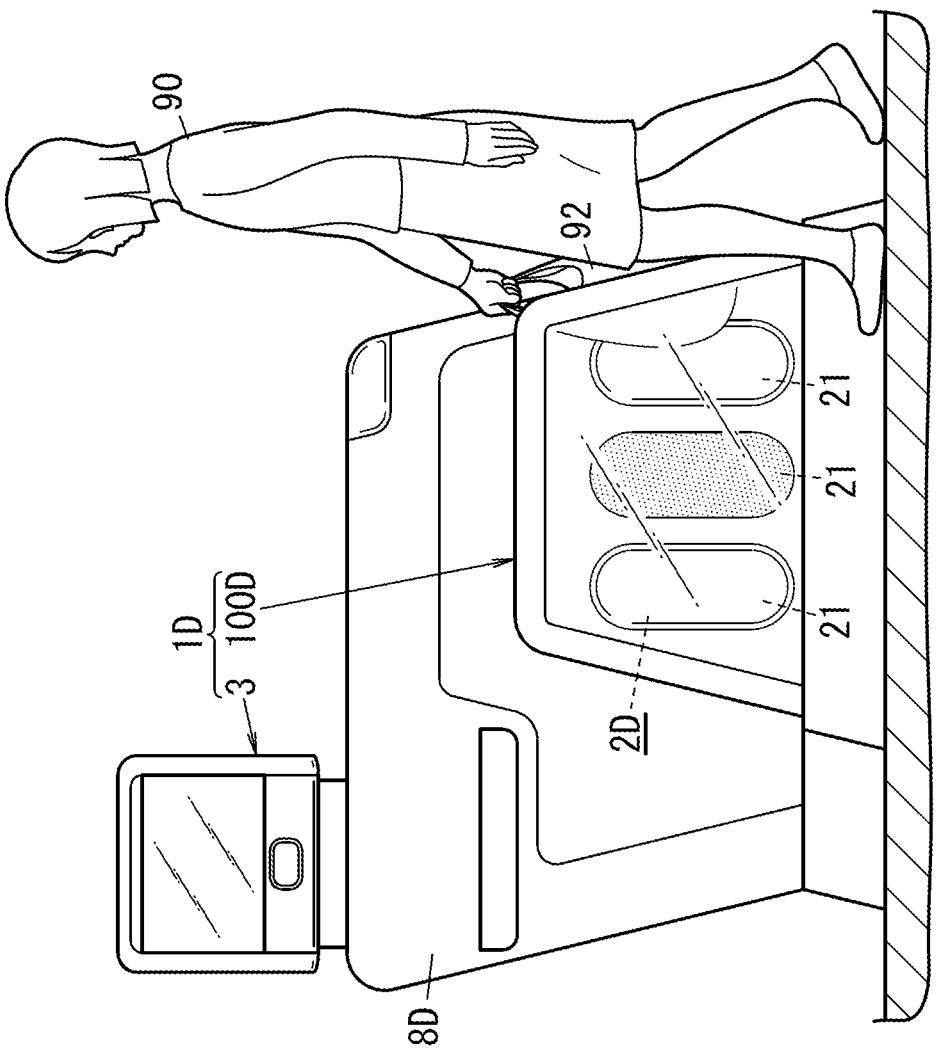
FIG. 14A is a front view illustrating a walk-through counter to which a shopping assistance system according to a fourth embodiment is applied.
Figure 14B:
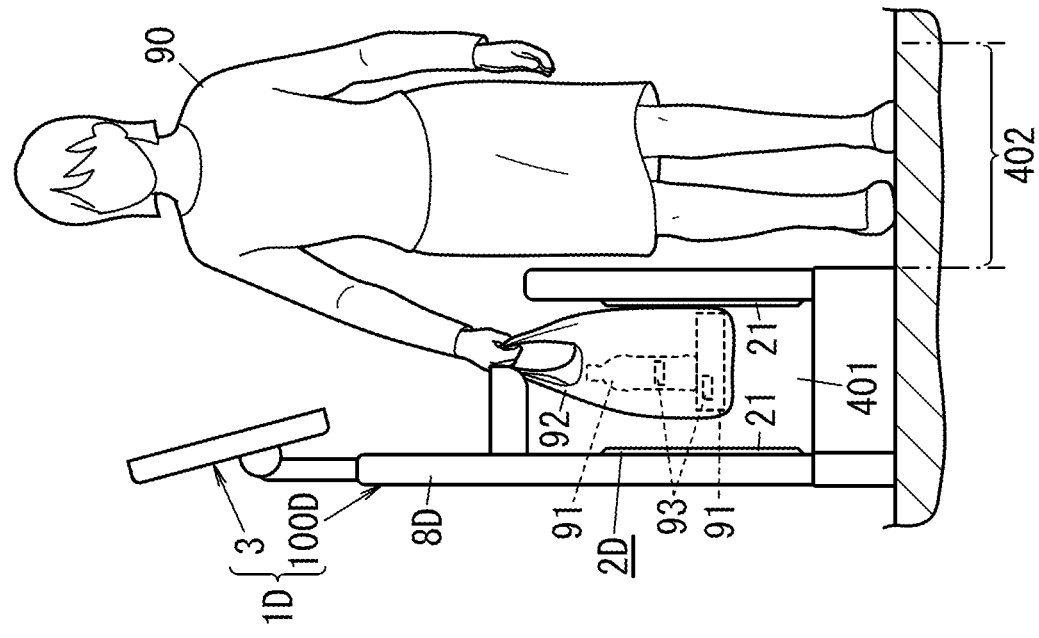
FIG. 14B is a side view illustrating the walk-through counter to which the shopping assistance system according to the fourth embodiment is applied.

As illustrated in FIGS. 14A and 14B, a shopping assistance system 1D according to the present embodiment is different from the shopping assistance system 1 of the first embodiment in that a reading device 2D is a device of walk-through type. Components similar to those in the first embodiment are hereinafter denoted by the same reference signs as those in the first embodiment, and the description thereof is accordingly omitted.

A reading system 100D according to the present embodiment includes a product path 401 and the reading device 2D of walk-through type. The product path 401 is a path which one or more items 91 held by a customer 90 passing through a customer path 402 pass through. While the one or more items 91 pass through the product path 401, the reading device 2D of walk-through type performs wireless communication with one or more electronic tag 93 respectively attached to the one or more items 91 by using a radio wave as a medium to read one or more pieces of item information respectively on the one or more items 91. As used herein, the "path" is a space which serves as a "passage" of an object and which is separated from surrounding spaces, for example, by a structural object such as a wall, a pillar, a cord, or a net; or a line drawn on a floor surface. That is, the product path 401 of the present embodiment is a space separated from surrounding spaces to have a width that allows at least an item 91 to pass therethrough. Similarly, the customer path 402 is a space separated from surrounding spaces to have a width that allows at least a customer 90 to pass therethrough.

Specifically, the reading system 100D and a checkout system 3 are provided to a walk-through counter 8D to be installed in a retail store. As illustrated in FIG. 14A, the walk-through counter 8D has the product path 401. The reading device 2D includes a plurality of antennas 21. The plurality of antennas 21 are arranged at locations of the walk-through counter 8D, the locations facing the product path 401. The reading device 2D transmits and receives a radio wave as a communication medium via the plurality of antennas 21 to perform wireless communication with an electronic tag 93 located in the product path 401. The walk-through counter 8D is laterally provided with the customer path 402 formed along the product path 401.

In the shopping assistance system 1D according to the present embodiment, the reading device 2D reads item information on an item 91 which is the object to be read in a non-contact manner, thereby achieving a state where checkout of the item 91 is possible. Thus, for example, pieces of item information on a plurality of items 91 is collectively readable, and also in a state where an item 91 remains accommodated in a container 92, item information of the item 91 is readable. Accordingly, it is possible to save labor that has to be performed by a sales clerk and a customer 90 for shopping by the customer 90 as compared to a case where item information is read from, for example, a barcode.

As described above, in the reading system 100D according to the present embodiment, while one or more items 91 pass through the product path 401, the reading device 2D performs wireless communication with one or more electronic tags 93 respectively attached to the one or more items 91 to read one or more pieces of item information respectively on the one or more items 91. Then, the customer 90 holding the one or more items 91 passes through the customer path 402, and thereby, the one or more items 91 held by the customer 90 pass through the product path 401 as the customer 90 moves. That is, when the customer 90 holding the one or more items 91, strictly speaking, the customer 90 holding the container 92 accommodating the one or more items 91 passes through the customer path 402, the one or more items 91 pass through the product path 401, and thereby, one or more pieces of item information respectively on the one or more items 91 are read by the reading device 2D. Thus, to cause the reading device 2D to read the one or more pieces of item information respectively on the one or more items 91, the customer 90 at least passes through the customer path 402 while holding the one or more items 91. Thus, the customer 90 does not have to stop in front of the reading device 2D, and an action of, for example, passing in front of the reading device 2D enables the one or more pieces of item information to be read by the reading device 2D.

Thus, when a customer 90 shops, the customer 90 picks up one or more items 91 which are objects to be read from a plurality of items 91 displayed in a retail store, and the customer 90 moves through the customer path 402 while holding the one or more items 91. Such a series of actions taken by the customer 90 enables the reading device 2D to read one or more pieces of item information respectively on the one or more items 91 which are the objects to be read. In the shopping assistance system 1D, the checkout system 3 performs a checkout process in accordance with the one or more pieces of item information read by the reading device 2D, and when the checkout process is completed, the customer 90 brings back the one or more items 91 to home, thereby completing shopping by the customer 90. Thus, the customer 90 does not have to stop at least only for reading of item information, but the customer 90 can smoothly proceed to a checkout process by a series of actions of picking up one or more items 91 and passing through the customer path 402. Consequently, according to the reading system 100D of the present embodiment and the shopping assistance system 1D including the reading system 100D, a waiting time of the customer 90 for purchasing one or more items 91 can be reduced.

Incidentally, in the shopping assistance system 1D according to the present embodiment, the number of times of reading one or more pieces of item information by the reading device 2D increases for one or more items 91 that are passing through the product path 401, for example, as illustrated in FIGS. 15A and 15B. FIGS. 15A, 15C, and 15E are views schematically illustrating that a customer 90 having one or more items 91 approaches the walk-through counter 8D and passes through the customer path 402. FIGS. 15B, 15D, and 15F respectively correspond to FIGS. 15A, 15C, and 15E and are waveform diagrams each illustrating an example of a change in the number of times of reading over time, where the abscissa represents a time axis, and the ordinate represents the number of times of reading (the number of times of reading which is the evaluation value).

In this case, for the one or more items 91 which are held by the customer 90 and which are objects to be read, the number of times of reading the pieces of item information by the reading device 2 changes, for example, as indicated by "I1" in FIGS. 15B, 15D, and 15F. In FIGS. 15B, 15D, and 15F, a situation is assumed where the reading device 2D may read pieces of item information on other items displayed, for example, near the walk-through counter 8D (hereinafter also referred to as "products around the checkout counter") than the item 91 which is the object to be read. The number of times of reading the pieces of item information on the products around the checkout counter by the reading device 2D is assumed to change, for example, as indicated by "I2" in FIGS. 15B, 15D, and 15F.

That is, as illustrated in FIGS. 15C and 15D, while the one or more items 91 are passing through the product path 401, the number of times of reading of item information increases for each of the one or more items 91 (see "I1" in FIG. 15D). Therefore, for example, the number of times of reading one or more pieces of item information during a passing time period from a time point t1 at which the one or more items 91 enter the product path 401 to a time point t2 at which the one or more items 91 exit the product path 401 is larger than during time periods before and after the passing time period, that is, before the time point t1 and after the time point t2. Thus, when the evaluation value (the number of times of reading) during the passing time period is compared to the evaluation value (the number of times of reading) of the time periods before and after the passing time period, the evaluation value of the passing time period is large, and the difference value (change amount) is greater than or equal to a threshold. Thus, the determining processor 12 determines that the one or more items 91 having passed through the product path 401 are objects to be read.

Figure 16A:
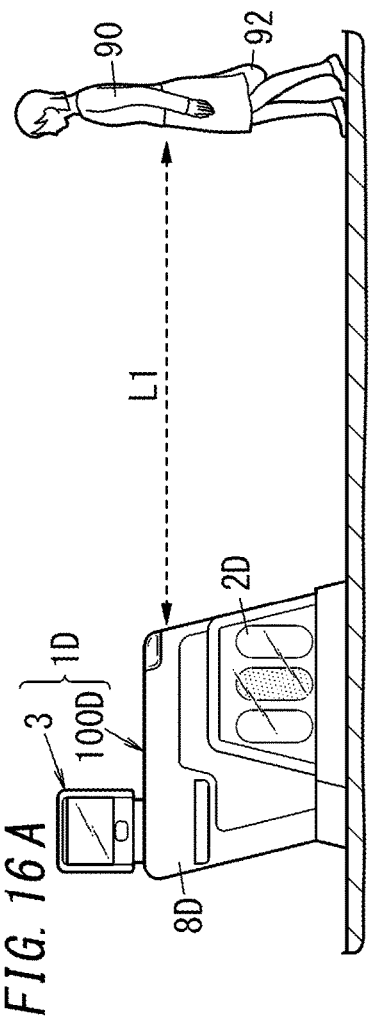
FIGS. 16A to 16F are views each illustrating another operation of the shopping assistance system according to the fourth embodiment.
Figure 16B:
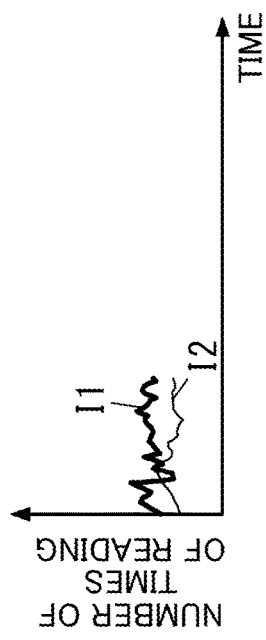
Figure 16C:
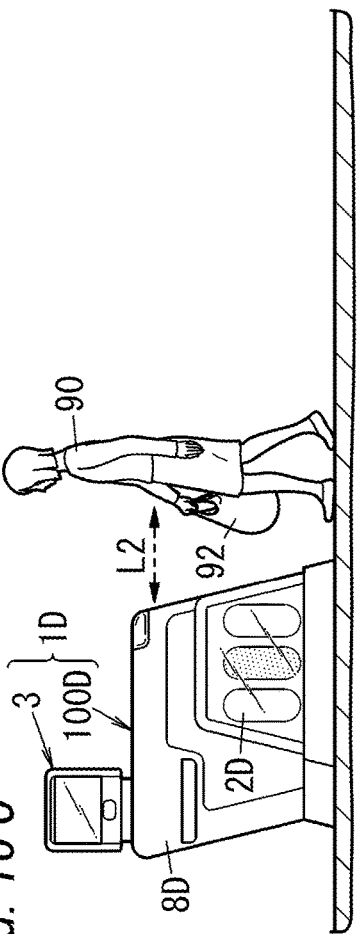
Figure 16D:
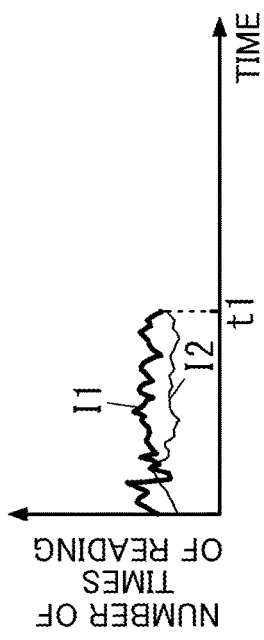
Figure 16E:
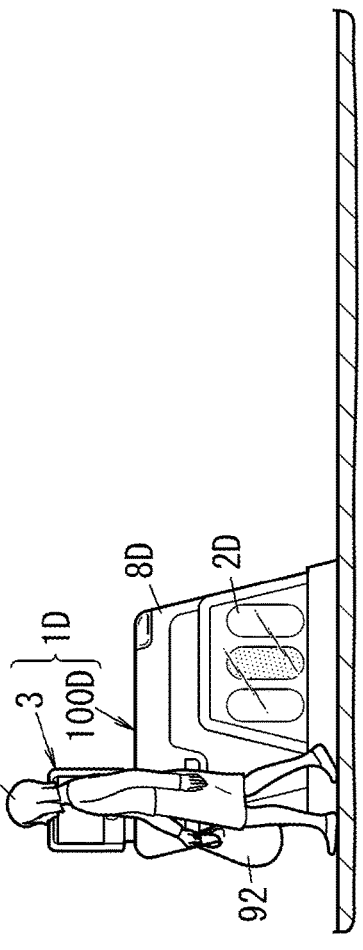
Figure 16F:
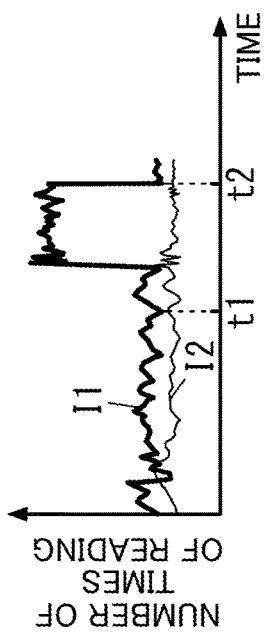

Moreover, with the shopping assistance system 1D according to the present embodiment, a time period during which the number of times of reading one or more pieces of item information may be determined in accordance with the distance from the walk-through counter 8D to the customer 90 for example, as illustrated in FIGS. 16A and 16B. FIGS. 16A, 16C, and 16E are views schematically illustrating that a customer 90 having one or more items 91 approaches the walk-through counter 8D and passes through the customer path 402. FIGS. 16B, 16D, and 16F respectively correspond to FIGS. 16A, 16C, and 16E and are waveform diagrams each illustrating an example of a change in the number of times of reading over time, where the abscissa represents a time axis, and the ordinate represents the number of times of reading (the number of times of reading which is the evaluation value).

In this case, as illustrated in FIG. 16A, when the distance from the walk-through counter 8D to the customer 90 becomes "L1", the sensing device 5 senses an entry of at least one of the one or more items 91 or a movable object (here, the customer 90) which moves together with the one or more items 91 into the approach area. At this time, the first time period P1 starts. Thereafter, as illustrated in FIG. 16C, when the customer 90 further approaches the walk-through counter 8D, the distance from the walk-through counter 8D to the customer 90 becomes "L2". At this time, the first time period P1 ends, and the second time period P2 starts. That is, in FIG. 16F, when the first time period P1 before the time point t1 is compared to the second time period P2 from the time point t1 to the time point t2, the number of times of reading one or more pieces of item information on the one or more items 91 is larger during the second time period P2 (see "I1" in FIG. 16F). Thus, when the evaluation value (the number of times of reading) during the first time period P1 is compared to the evaluation value (the number of times of reading) of the second time period P2, the evaluation value in the second time period P2 is large, and the difference value (change amount) is greater than or equal to a threshold. Thus, the determining processor 12 determines that the one or more items 91 having passed through the product path 401 are objects to be read.

The various configurations (including variations) described in the fourth embodiment are adoptable accordingly in combination with the various configurations (including the variations) described in the first embodiment, the second embodiment, or the third embodiment.

(Summary)

As described above, a reading system (100, 100D) of a first aspect includes an evaluation value acquirer (11) and a determining processor (12). The evaluation value acquirer (11) is configured to acquire, with regard to a reading device (2, 2A, 2B, 2C, 2D) configured to perform the wireless communication with an electronic tag (93) attached to each of one or more items (91) by using a radio wave as a medium to read item information on each of the one or more items (91), an evaluation value about at least one of: a total number of times; a time interval; or a frequency, of reading the item information for each of the one or more items (91). The determining processor (12) is configured to determine, for each of the one or more items (91), whether or not each of the one or more items (91) is an object to be read based on a change in the evaluation value over time.

With this aspect, for example, the reading device (2, 2A, 2B, 2C, 2D) may read item information on an item (91) which is not an object to be read, such as an item (91) displayed in the vicinity of the reading device (2, 2A, 2B, 2C, 2D), but it is possible to distinguish the item (91) from the object to be read. Thus, the reading system (100, 100D) provides the advantage that an item is less likely to be erroneously determined as an object to be read.

In a reading system (100, 100D) of a second aspect referring to the first aspect, the determining processor (12) is configured to determine, for each of the one or more items (91), whether or not each of the one or more items (91) is the object to be read based on whether or not a change amount of the change in the evaluation value over time belongs to a prescribed range.

With this aspect, whether or not each of the one or more items (91) is the object to be read is determined based on whether or not the change amount of the change in the evaluation value over time belongs to the prescribed range, and therefore, the determination accuracy of the object to be read is adjustable depending on setting of the prescribed range.

In a reading system (100, 100D) of a third aspect referring to the first or second aspect, the determining processor (12) is configured to determine, for each of the one or more items (91), whether or not each of the one or more items (91) is the object to be read based on a result of a comparison between the evaluation value in a first time period (P1) and the evaluation value in a second time period (P2) set after an end of the first time period (P1).

With this aspect, in such a case where the evaluation value relatively largely changes between the first time period (P1) and the second time period (P2), each of the one or more items (91) is easily determined to be the object to be read.

In a reading system (100, 100D) of a fourth aspect referring to the third aspect, at least one of the first time period (P1) or the second time period (P2) is a time period determined based on a sensing result by the sensing device (5) configured to sense a location of each of the one or more items (91).

With this aspect, at least one of the first time period (P1) or the second time period (P2) is automatically set based on a sensing result by the sensing device (5).

In a reading system (100, 100D) of a fifth aspect referring to the fourth aspect, the second time period (P2) starts when the sensing device (5) senses an entry of the one or more items (91) or a movable object moving together with the one or more items (91) into a prescribed area.

With this aspect, the starting time point of the second time period (P2) is automatically set.

In a reading system (100, 100D) of a sixth aspect referring to the fifth aspect, the first time period (P1) starts when the sensing device (5) senses the entry of the one or more items (91) or a movable object moving together with the one or more items (91) into an approach area. The approach area is an area set on an entering pathway to the prescribed area.

With this aspect, the starting time point of the first time period (P1) is automatically set.

In a processing system (100, 100D) of a seventh aspect referring to any one of the third to sixth aspects, the first time period (P1) includes a plurality of time slots (Ts11 to Ts15), and the second time period (P2) includes a plurality of time slots (Ts21 to Ts25). The determining processor (12) is configured to use a representative value of evaluation values in the plurality of time slots (Ts11 to Ts15) as the evaluation value in the first time period (P1) and use a representative value of evaluation values in the plurality of time slots (Ts21 to Ts25) as the evaluation value in the second time period (P2).

With this aspect, the evaluation values of the first time period (P1) and the second time period (P2) are relatively accurately obtained.

In a processing system (100, 100D) of an eighth aspect referring to any one of the first to seventh aspects, a determination condition of the determining processor (12) is changed in accordance with a total number of the one or more items (91) whose item information is read by the reading device (2, 2A, 2B, 2C, 2D) in a prescribed time period.

With this aspect, the determination condition of the determining processor (12) automatically changes in accordance with the number of the one or more items (91) whose item information is read, and therefore, the determination accuracy of objects to be read can be improved.

In a processing system (100, 100D) of a ninth aspect referring to any one of the first to seventh aspects, a determination condition of the determining processor (12) is changed in accordance with a total number of the one or more items (91) whose item information is read by the reading device (2, 2A, 2B, 2C, 2D) in a prescribed time period and in which at least one of the evaluation value or a received signal strength indication at a time period of wireless communication by the reading device (2, 2A, 2B, 2C, 2D) is greater than or equal to a reference value.

With this aspect, the determination condition of the determining processor (12) automatically changes in accordance with the number of the one or more items (91) whose item information is read, and therefore, the determination accuracy of objects to be read can be improved.

In a processing system (100, 100D) of a tenth aspect referring to any one of the first to seventh aspects, a determination condition of the determining processor (12) is changed in accordance with a total number of the one or more items (91) present in a prescribed area.

With this aspect, the determination condition of the determining processor (12) automatically changes in accordance with the number of the one or more items (91) present in the prescribed area, and therefore, the determination accuracy of objects to be read can be improved.

A reading system (100, 100D) of an eleventh aspect referring to any one of the first to tenth aspects, further comprising a strength indication acquirer (15) configured to acquire a received signal strength indication at the reading device (2, 2A, 2B, 2C, 2D) while the reading device (2, 2A, 2B, 2C) performs wireless communication. The determining processor (12) is configured to determine whether or not each of the one or more items (91) is an object to be read based on a combination of the change in the evaluation value over time and the received signal strength indication.

With this aspect, for determination of whether or not each of the one or more items (91) is the object to be read, the received signal strength indication is used in addition to the change in the evaluation value over time, and therefore, the determination accuracy of the object to be read is improved.

A reading system (100, 100D) of a twelfth aspect referring to any one of the first to eleventh aspects further includes: the reading device (2, 2A, 2B, 2C, 2D).

With this aspect, operation as the reading system (100, 100D) is achieved without additionally providing the reading device (2, 2A, 2B, 2C, 2D).

A shopping assistance system (1, 1A, 1B, 1C, 1D) according to a thirteenth aspect includes the reading system (100, 100D) of any one of the first to twelfth aspects, and a checkout system (3) configured to perform a checkout process of the one or more items (91). The checkout system (3) is configured to perform, based on the item information, the checkout process of the one or more items (91) determined as the object to be read by the determining processor (12).

With this aspect, for example, the reading device (2, 2A, 2B, 2C, 2D) may read item information on an item (91) which is not an object to be read, such as an item (91) displayed in the vicinity of the reading device (2, 2A, 2B, 2C, 2D), but it is possible to distinguish the item (91) from the object to be read. Thus, the shopping assistance system (1, 1A, 1B, 1C, 1D) provides the advantage that an item is less likely to be erroneously determined as an object to be read. In addition, the item information on each of the one or more items (91) determined to be the object to be read can be used for the checkout process performed by the checkout system (3).

In a shopping assistance system (1, 1A, 1B, 1C, 1D) of a fourteenth aspect referring to the thirteenth aspect, the checkout system (3) is configured to perform the checkout process based on the item information read by the reading device (2, 2A, 2B, 2C, 2D) at least while each of the one or more items (91) is in a prescribed area.

With this aspect, a customer (90) simply puts each of the one or more items (91) which is the object to be purchased in the prescribed area, and thereby, each of the one or more items (91) can be subjected to the checkout process.

A reading method of a fifteenth aspect includes acquiring, with regard to a reading device (2, 2A, 2B, 2C, 2D) configured to perform wireless communication with an electronic tag (93) attached to each of one or more items (91) by using a radio wave as a medium to read item information on each of the one or more items (91), an evaluation value about at least one of: a total number of times; an interval; or a frequency, of reading item information for each of the one or more items (91). The reading method includes determining, for each of the one or more items (91), whether or not each of the one or more items (91) is an object to be read based on a change in the evaluation value over time.

This aspect provides the advantage that an item is less likely to be erroneously determined as an object to be read.

A program according to a sixteenth aspect is a program configured to cause a computer system to execute a process of acquiring, with regard to a reading device (2, 2A, 2B, 2C, 2D) configured to perform the wireless communication with an electronic tag (93) attached to each of one or more items (91) by using a radio wave as a medium to read item information on each of the one or more items (91), an evaluation value about at least one of: a total number of times; a time interval; or a frequency, of reading the item information, for each of the one or more items (91). The program is a program configured to cause the computer system to execute a process of determining, for each of the one or more items (91), whether or not each of the one or more items (91) is an object to be read based on a change in the evaluation value over time.

This aspect provides the advantage that an item is less likely to be erroneously determined as an object to be read.

These aspects should not be construed as limiting, but various configurations (including variations) of the reading system (100, 100D) according to the first embodiment, the second embodiment, the third embodiment, and the fourth embodiment may be embodied in a reading method or a program.

The configurations according to the second to twelfth aspects are not configurations essential for the reading system (100, 100D) and may accordingly be omitted.

The configuration of the thirteenth aspect is not an essential configuration of the shopping assistance system (1, 1A, 1B, 1C, 1D) and may accordingly be omitted.

REFERENCE SIGNS LIST 1, 1A, 1B, 1C, 1D SHOPPING ASSISTANCE SYSTEM
2, 2A, 2B, 2C, 2D READING DEVICE
3 CHECKOUT SYSTEM
5 SENSING DEVICE
11 EVALUATION VALUE ACQUIRER
12 DETERMINING PROCESSOR
15 STRENGTH INDICATION ACQUIRER
91 ITEM
93 ELECTRONIC TAG
100, 100D READING SYSTEM

P1 FIRST TIME PERIOD
P2 SECOND TIME PERIOD
Ts11 to Ts15, Ts21 to Ts25 TIME SLOT

What is claimed is:

1. A reading system, comprising:
an evaluation value acquirer installed at a checkout counter, the evaluation value acquirer configured to acquire, with regard to a reading device configured to perform wireless communication with an electronic tag attached to each of one or more items by using a radio wave as a medium to read item information on each of the one or more items, an evaluation value about at least one of: a total number of times; a time interval; or a frequency, of reading the item information for each of the one or more items; and
a determining processor configured to determine, for each of the one or more items, whether or not each of the one or more items is an object that is placed on the checkout counter to be read by the evaluation value acquirer installed at the checkout counter based on a change in the evaluation value over time.

2. The reading system of claim 1, wherein
the determining processor is configured to determine, for each of the one or more items, whether or not each of the one or more items is the object to be read based on whether or not a change amount of the change in the evaluation value over time belongs to a prescribed range.

3. The reading system of claim 1, wherein
the determining processor is configured to determine, for each of the one or more items, whether or not each of the one or more items is the object to be read based on a result of a comparison between the evaluation value in a first time period and the evaluation value in a second time period set after an end of the first time period.

4. The reading system of claim 3, wherein
at least one of the first time period or the second time period is a time period determined based on a sensing result by a sensing device configured to sense a location of each of the one or more items.

5. The reading system of claim 4, wherein
the second time period starts when the sensing device senses an entry of the one or more items or a movable object moving together with the one or more items into a prescribed area.

6. The reading system of claim 5, wherein
the first time period starts when the sensing device senses the entry of the one or more items or the movable object moving together with the one or more items into an approach area set on an entering pathway to the prescribed area.

7. The reading system of claim 3, wherein
the first time period includes a plurality of time slots,
the second time period includes a plurality of time slots, and
the determining processor is configured to use a representative value of evaluation values in the plurality of time slots of the first time period as the evaluation value in the first time period and use a representative value of evaluation values in the plurality of time slots of the second time period as the evaluation value in the second time period.

8. The reading system of claim 1, wherein
a determination condition of the determining processor is changed in accordance with a total number of the one or more items whose item information is read by the reading device in a prescribed time period.

9. The reading system of claim 1, wherein
a determination condition of the determining processor is changed in accordance with a total number of the one or more items whose item information is read by the reading device in a prescribed time period and in which at least one of the evaluation value or a received signal strength indication at a time period of wireless communication by the reading device is greater than or equal to a reference value.

10. The reading system of claim 1, wherein
a determination condition of the determining processor is changed in accordance with a total number of the one or more items present in a prescribed area.

11. The reading system of claim 1, further comprising a strength indication acquirer configured to acquire a received signal strength indication at the reading device while the reading device performs wireless communication, wherein
the determining processor is configured to determine whether or not each of the one or more items is the object to be read based on a combination of the change in the evaluation value over time and the received signal strength indication.

12. The reading system of claim 1, further comprising the reading device.

13. A shopping assistance system, comprising:
the reading system of claim 1; and
a checkout system configured to perform, based on the item information, a checkout process of the one or more items determined as the object to be read by the determining processor.

14. The shopping assistance system of claim 13, wherein
the checkout system is configured to perform the checkout process based on the item information read by the reading device at least while the one or more items is in a prescribed area.

15. The reading system of claim 1, wherein
the change in the evaluation value over time is based on a change amount of successful reads of item information.

16. The reading system of claim 15, wherein
the change in the evaluation value over time is based on a change amount of successful reads of item information.

17. A reading method, comprising:
acquiring, with regard to a reading device that is installed at a checkout counter and is configured to perform wireless communication with an electronic tag attached to each of one or more items by using a radio wave as a medium to read item information on each of the one or more items, an evaluation value about at least one of: a total number of times; a time interval; or a frequency of reading the item information for each of the one or more items; and
determining, for each of the one or more items, whether or not each of the one or more items is an object that is placed on the checkout counter to be read by the evaluation value acquirer installed at the checkout counter based on a change in the evaluation value over time.

18. A program configured to cause a computer system to execute:
a process of acquiring, with regard to a reading device that is installed at a checkout counter and is configured to perform wireless communication with an electronic tag attached to each of one or more items by using a radio wave as a medium to read item information on each of the one or more items, an evaluation value about at least one of: a total number of times; a time interval; or a frequency of reading the item information, for each of the one or more items; and a process of determining, for each of the one or more items, whether or not each of the one or more items is an object that is placed on the checkout counter to be read by the evaluation value acquirer installed at the checkout counter based on a change in the evaluation value over time.

19. The reading method of claim 18, wherein the change in the evaluation value over time is based on a change amount of successful reads of item information.

* * * * *